(12) United States Patent
Ilola et al.

(10) Patent No.: US 11,553,017 B1
(45) Date of Patent: Jan. 10, 2023

(54) TIMED MEDIA HTTP REQUEST AGGREGATION

(71) Applicant: Nokia Technologies Oy, Espoo (FI)

(72) Inventors: Lauri Aleksi Ilola, Munich (DE); Lukasz Kondrad, Munich (DE); Christoph Bachhuber, Munich (DE); Sebastian Schwarz, Unterhaching (DE); Miska Matias Hannuksela, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/684,838

(22) Filed: Mar. 2, 2022

Related U.S. Application Data

(60) Provisional application No. 63/158,481, filed on Mar. 9, 2021.

(51) Int. Cl.
| | |
|---|---|
| *H04L 12/24* | (2006.01) |
| *H04L 29/08* | (2006.01) |
| *H04L 29/06* | (2006.01) |
| *H04L 65/61* | (2022.01) |
| *H04L 67/02* | (2022.01) |
| *H04L 65/752* | (2022.01) |
| *G06F 15/173* | (2006.01) |
| *G06F 15/16* | (2006.01) |

(52) U.S. Cl.
CPC ............ *H04L 65/61* (2022.05); *H04L 65/752* (2022.05); *H04L 67/02* (2013.01)

(58) Field of Classification Search
USPC ......................................................... 709/231
See application file for complete search history.

(56) References Cited

U.S. PATENT DOCUMENTS

| | | | |
|---|---|---|---|
| 6,510,214 B1 * | 1/2003 | McDaniel | H04M 15/8016 379/221.09 |
| 8,560,598 B2 * | 10/2013 | Santoro | H04L 67/1008 709/227 |
| 9,602,802 B2 | 3/2017 | Chen et al. | |
| 2008/0208959 A1 * | 8/2008 | St. John | H04L 67/563 709/203 |
| 2008/0209490 A1 | 8/2008 | Dankworth et al. | |
| 2010/0271947 A1 * | 10/2010 | Abdelal | H04L 47/28 370/235 |
| 2012/0023250 A1 | 1/2012 | Chen et al. | |
| 2012/0259946 A1 | 10/2012 | Stockhammer et al. | 709/217 |
| 2014/0269275 A1 * | 9/2014 | Jun | H04W 28/0289 370/230 |

(Continued)

OTHER PUBLICATIONS

"Text of ISO/IEC FDIS 23009-1 $4^{th}$ edition",, ISO/IEC JTC 1/SC 29/WG 11 N18609, Aug. 12, 2019, 287 pages.

*Primary Examiner* — Jude Jean Gilles
(74) *Attorney, Agent, or Firm* — Harrington & Smith

(57) ABSTRACT

An apparatus may be configured to: transmit, to a client, an indication of one or more request-response overload capabilities; receive, from the client, at least one request for a plurality of media segments based, at least partially, on the indication of the one or more request-response overload capabilities; and transmit, to the client, at least one response comprising the plurality of media segments. The apparatus may be, for example, a media server, an HTTP overload handler, an edge server, a DANE, etc.

20 Claims, 9 Drawing Sheets

(56) References Cited

U.S. PATENT DOCUMENTS

| | | | |
|---|---|---|---|
| 2014/0379871 A1* | 12/2014 | Van Brandenburg | ........................ H04L 65/613 709/219 |
| 2015/0150086 A1* | 5/2015 | Clark | .................. H04L 67/1004 705/3 |
| 2015/0237166 A1 | 8/2015 | Denoual et al. | |
| 2017/0099316 A1* | 4/2017 | Bisiaux | ............... H04L 63/1458 |
| 2017/0171287 A1 | 6/2017 | Famaey | .............................. 67/2 |
| 2019/0075469 A1* | 3/2019 | Mahoney | ............... H04W 16/10 |
| 2019/0364261 A1 | 11/2019 | Hwang et al. | |
| 2019/0394100 A1* | 12/2019 | Lamba | .................... H04L 67/63 |
| 2021/0021659 A1 | 1/2021 | Takabayashi et al. | .......... 65/601 |

* cited by examiner

TIMED MEDIA HTTP REQUEST AGGREGATION

PRIORITY BENEFIT

This application claims priority under 35 U.S.C. 119(e)(1) to U.S. Provisional Patent Application No. 63/158,481, filed Mar. 9, 2021 which is hereby incorporated by reference in its entirety.

TECHNICAL FIELD

The example and non-limiting embodiments relate generally to video data and specifically to HTTP requests for video data.

BACKGROUND

It is known, in networking, to request media, including volumetric video data, using hypertext transfer protocol requests.

SUMMARY

The following summary is merely intended to be illustrative. The summary is not intended to limit the scope of the claims.

In accordance with one aspect, a method comprising: receiving, with a user equipment, an indication of one or more request-response overload capabilities; based on the indication of the one or more request-response overload capabilities, transmitting at least one request to a media server, wherein the at least one request is configured to request a plurality of media segments; and receiving, from the media server, at least one response to the request, wherein the at least one response comprises the plurality of media segments.

In accordance with one aspect, an apparatus comprising: at least one processor; and at least one memory and computer program code, wherein the at least one memory and the computer program code are configured to, with the at least one processor, cause the apparatus to: receive an indication of one or more request-response overload capabilities; based on the indication of the one or more request-response overload capabilities, transmit at least one request to a media server, wherein the at least one request is configured to request a plurality of media segments; and receive, from the media server, at least one response to the request, wherein the at least one response comprises the plurality of media segments.

In accordance with one aspect, an apparatus comprising means for performing: receiving an indication of one or more request-response overload capabilities; based on the indication of the one or more request-response overload capabilities, transmitting at least one request to a media server, wherein the at least one request is configured to request a plurality of media segments; and receiving, from the media server, at least one response to the request, wherein the at least one response comprises the plurality of media segments.

In accordance with one aspect, a non-transitory computer-readable medium comprising program instructions stored thereon which, when executed with at least one processor, cause the at least one processor to: receive an indication of one or more request-response overload capabilities; based on the indication of the one or more request-response overload capabilities, transmit at least one request to a media server, wherein the at least one request is configured to request a plurality of media segments; and receive, from the media server, at least one response to the request, wherein the at least one response comprises the plurality of media segments.

In accordance with one aspect, a method comprising: transmitting, from an overload handler to a client, an indication of one or more request-response overload capabilities; receiving, from the client, at least one request for a plurality of media segments based, at least partially, on the indication of the one or more request-response overload capabilities; and transmitting, to the client, at least one response comprising the plurality of media segments.

In accordance with one aspect, an apparatus comprising: at least one processor; and at least one memory and computer program code, wherein the at least one memory and the computer program code are configured to, with the at least one processor, cause the apparatus to: transmit, to a client, an indication of one or more request-response overload capabilities; receive, from the client, at least one request for a plurality of media segments based, at least partially, on the indication of the one or more request-response overload capabilities; and transmit, to the client, at least one response comprising the plurality of media segments.

In accordance with one aspect, an apparatus comprising means for performing: transmitting, to a client, an indication of one or more request-response overload capabilities; receiving, from the client, at least one request for a plurality of media segments based, at least partially, on the indication of the one or more request-response overload capabilities; and transmitting, to the client, at least one response comprising the plurality of media segments.

In accordance with one aspect, a non-transitory computer-readable medium comprising program instructions stored thereon which, when executed with at least one processor, cause the at least one processor to: transmit, to a client, an indication of one or more request-response overload capabilities; receive, from the client, at least one request for a plurality of media segments based, at least partially, on the indication of the one or more request-response overload capabilities; and transmit, to the client, at least one response comprising the plurality of media segments.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
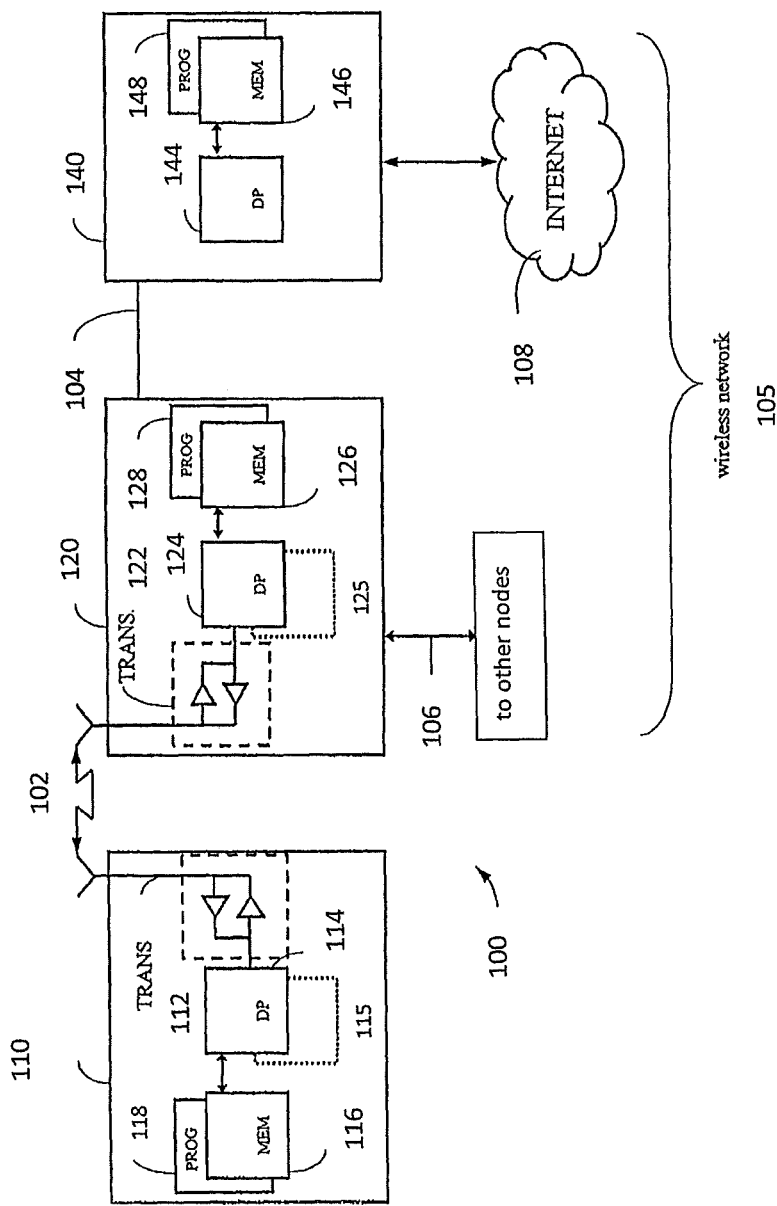
FIG. 1 is a block diagram of one possible and non-limiting exemplary system in which the exemplary embodiments may be practiced.

The following abbreviations that may be found in the specification and/or the drawing figures are defined as follows:
  3D three dimensional
  3GPP third generation partnership project
  5G fifth generation
  5GC 5G core network
  6DoF six degrees of freedom
  AHS adaptive HTTP streaming
  AR augmented reality
  AVC advanced video coding
  CDN content delivery network
  CTU coding tree units
  DANE DASH aware network element
  DASH dynamic adaptive streaming over HTTP
  DP data processor
  DRM digital rights management
  DSP digital signal processor
  EBML Extensible Binary Meta Language
  HEIF high efficiency image file format
  HEVC High Efficiency Video Coding Standard
  HTTP hypertext transfer protocol
  HTTPS hypertext transfer protocol secure
  ISOBMFF ISO Base Media File Format
  JSON JavaScript Object Notation
  MCTS motion-constrained tile set
  MEM memory
  MIME Multipurpose Internet Mail Extensions
  MIV MPEG immersive video
  MME mobility management entity
  MPD media presentation description
  MPEG Moving Picture Experts Group
  MR mixed reality
  MTU Maximum Transmission Unit
  OMAF Omnidirectional Media Format
  PDA personal digital assistant
  PROG program
  PSS packet-switched streaming
  RF radio frequency
  RNE regular network element
  RRC radio resource control
  SAND server- and network-assisted DASH
  SGW serving gateway
  TLS transport layer security
  UE user equipment (e.g., a wireless, typically mobile device)
  URI uniform resource identifier
  URN uniform resource name
  URL uniform resource locator
  V3C visual volumetric video-based coding
  V-PCC video-based point cloud compression
  VR virtual reality
  VS viewport-specific
  VVC versatile video coding
  XML extensible markup language The following describes suitable apparatus and possible mechanisms for practicing example embodiments of the present disclosure. Accordingly, reference is first made to FIG. 1, which illustrates a wireless system in which embodiments of the present disclosure may be practiced.

A user equipment may comprise a device that can access a network and/or cloud through a wired or wireless connection. The user equipment may comprise one or more processors, one or more memories, and one or more transceivers interconnected through one or more buses. Each of the one or more transceivers includes a receiver and a transmitter. The one or more buses may be address, data, or control buses, and may include any interconnection mechanism, such as a series of lines on a motherboard or integrated circuit, fiber optics or other optical communication equipment, and the like. The one or more transceivers may be connected to one or more antennas. The one or more memories may include computer program code. The one or more memories and the computer program code may be configured to, with the one or more processors, cause the user equipment to perform one or more of the operations as described herein.

The user equipment may connect to a node of a network. The network node may comprise one or more processors, one or more memories, and one or more transceivers interconnected through one or more buses. Each of the one or more transceivers may include a receiver and a transmitter. The one or more buses may be address, data, or control buses, and may include any interconnection mechanism, such as a series of lines on a motherboard or integrated circuit, fiber optics or other optical communication equipment, and the like. The one or more transceivers may be connected to one or more antennas. The one or more memories may include computer program code. The one or more memories and the computer program code may be configured to, with the one or more processors, cause the network node to perform one or more of the operations as described herein.

Referring now to FIG. 1, this figure shows a block diagram of one possible and non-limiting example in which the examples may be practiced. In the wireless system 100, a wireless network 105 is adapted for communication over a wireless link 102 with an apparatus, such as a (mobile) communication device which may be referred to as a user equipment 110, via a network access node 120. The network 105 may include a network control element 140 that may include mobility management entity (MME)/serving gateway (SGW) functionality, and which provides connectivity with a network, such as a telephone network and/or a data communications network (e.g., the internet 108).

The user equipment 110 may include a controller, such as a computer or a data processor (DP) 114, a computer-readable memory medium embodied as a memory (MEM) 116 that stores a program of computer instructions (PROG) 118, and a suitable wireless interface, such as a radio frequency transceiver 112, for bidirectional wireless communications with access node 120 via one or more antennas with wireless link 102.

The access node 120 may also include a controller, such as a computer or a data processor (DP) 124, a computer-readable memory medium embodied as a memory (MEM) 126, that stores a program of computer instructions (PROG) 128, and a suitable wireless interface, such as transceiver 122, for communication with the user equipment 110 via one or more antennas with wireless link 102. The access node 120 may be coupled via a data/control path 104 to the network control element 140. The path 104 may be implemented as an interface. The access node 120 may also be coupled to another node via data/control path 106, which may be implemented as an interface.

The network control element 140 may include a controller, such as a computer or a data processor (DP) 144, a computer-readable memory medium embodied as a memory (MEM) 146 that stores a program of computer instructions (PROD) 148.

At least one of the PROGs 118, 128, and 148 is assumed to include program instructions that, when executed by the associated DP, enable the device to operate in accordance with exemplary embodiments of the present disclosure, as will be discussed below in greater detail. That is, various exemplary embodiments of the present disclosure may be implemented at least in part by computer software executable by the DP 114 of the user equipment 110; by the DP 124 of the access node 120; and/or by the DP 144 of the network control element 140, or by hardware, or by a combination of software and hardware (and firmware).

For example, the user equipment 110 may be configured to perform one or more of the functions of a (DASH) client and/or may include a client application, and may transmit HTTP requests and receive HTTP responses over wireless link 102. One or more applications may operate on a user equipment 110. Such a user equipment may include or be in communication with one or more decoders capable of decoding (sub)segments received over wireless link 102. Such a user equipment may include or be in communication with a means for displaying decoded video content, such as a display screen, head-mounted display, or another device capable of rendering an augmented reality (AR), virtual reality (VR), and/or mixed reality (MR) experience. Such a user equipment may include or be in communication with a means for determining a location/position or orientation of a user of decoded video content, such as an input device, global positioning system, Bluetooth positioning system, gyroscope, depth sensor, etc.

For example, the user equipment 110 may be configured to perform one or more of the functions of an HTTP overload handler or DANE, and may receive HTTP requests and transmit HTTP responses over wireless link 102. Such a user equipment may be included in or be in communication with one or more servers, media origins, and/or memories comprising one or more MPD.

For the purposes of describing various exemplary embodiments in accordance with the present disclosure, the user equipment 110 and the access node 120 may also include dedicated processors, for example RRC module 115 and a corresponding RRC module 125. RRC module 115 and RRC module 125 may be constructed so as to operate in accordance with various exemplary embodiments in accordance with the present disclosure.

The computer readable MEMs 116, 126, and 146 may be of any type suitable to the local technical environment and may be implemented using any suitable data storage technology, such as semiconductor-based memory devices, flash memory, magnetic memory devices and systems, optical memory devices and systems, fixed memory and removable memory. The DPs 114, 124, and 144 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 112 and 122) may be of any type suitable to the local technical environment and may be implemented using any suitable communication technology such as individual transmitters, receivers, transceivers or a combination of such components.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Features as described herein generally relate to parallel streaming of video tracks which contribute to the same visual presentation. Example embodiments of the present disclosure may enable multiple portions of video to be transmitted together while reducing latency and overhead.

"Networking" may describe the exchange of data over a transmission entity, i.e. the network. For example, in the example of FIG. 1, networking may describe the exchange of data between user equipment 110 over wireless network 105. For networking, latency, data rate, availability, and packet loss rate are relevant parameters.

"Latency" describes the time that passes between two events, i.e., round-trip latency is the time that passes from a client sending out a request to a server over the network, until the client receives the response of the server. Latency is mainly comprised of two parts. First, propagation latency is equal to the physical distance that data must cover divided by the propagation speed of the data. This latency grows with the physical distance between the communicating entities. Second, transmission latency is the time that it takes the transmitted data to be transmitted onto the physical interface. For example, transmitting 1 Mb of data over an interface with a data rate of 1 Gb/s may entail 1 millisecond of transmission latency.

In addition to influencing transmission latency, data rate typically limits the applications that exchange data over the network in terms of the amount of exchanged data per time unit. Applications may use compression algorithms, such as video coding, to cope with network data rate limitations.

"Availability" describes the percentage of time for which the network is available for usage. "Packet loss rate" is the probability with which a packet sent over the network will become so corrupted that it can't be used anymore.

Hypertext transfer protocol (HTTP) requests relate to the network parameters as discussed in the following. HTTP provides methods for a client communicating with a server. First, the GET method allows requesting a resource, for example a file, from a server through a defined URL. URL parameters may be associated with the URL for sending additional information to the server. Alternatively, the POST method attaches additional data to the request body and is intended for sending large amounts of data or private data. The HEAD method requests only the meta information of a response, such as the message size, without the response body. The PUT method requests that the server store the given data under the provided URL, and the DELETE method requests deletion of data under the provided URL.

HTTP methods add HTTP headers to their requests to coordinate communication between server and client. A HTTP header consists of fields, which are key-value pairs. Possible fields include the HTTP version, status code, server software version, content encoding, content type, content length, content md5 sum, etc. There are close to 100 standardized header fields. An entity sending an HTTP request/response may choose a subset of these HTTP header fields in order to compose a HTTP header suitable for the request. The typical header size ranges from ~200 bytes to over 2 KB. With the rich feature set used nowadays, header sizes of 700-800 bytes are common.

If the message content itself is small, the header size may contribute significant overhead. For a longer session between two non-changing parties, many constant fields may be repeatedly sent with each new HTTP request. Networking and HTTP requests may interact in terms of latency; if client and server must exchange many HTTP messages for establishing and maintaining the application, the client may experience many times the round-trip latency as application start-up delay or usage delay. It may therefore be preferable to minimize the number of HTTP requests made. Coincidently, fewer requests may mean less overhead from the HTTP headers. However, it should be noted that fewer HTTP requests may result in decreased interactivity. Interactivity may be balanced against round-trip delay/latency.

HTTP Secure (HTTPS) extends HTTP by encrypting the exchanged data using Transport Layer Security (TLS), which is widely used for secure communication on the web. The added TLS mechanism authenticates the accessed server with third-party certificates. TLS protects the integrity and privacy of the transmitted data using bidirectional encryption. TLS establishes a secure connection (HTTPS session) between the communicating parties by performing an initial handshake. This handshake performs multiple TLS requests and responses; it therefore adds a couple of round-trip delays to the setup time of an HTTPS session.

JSON (JavaScript Object Notation) batching addresses multiple simultaneous HTTP requests by introducing a general way of grouping HTTP requests. The client gathers/includes all requests in one JSON object as a list titled 'requests'. Each of the list items needs to provide 'method', 'url', and a unique 'id'. Requests can also contain HTTP headers, for example for POST HTTP requests. The client can define a request sequence using 'dependsOn' and giving a request ID on which a request depends.

Analogous to the batched requests, the response is included in a JSON object, with list 'responses' mirroring list 'requests.' Response order might be different compared to request order, but responses are identifiable through field 'id'. In addition to 'id', each response field contains 'status' and the HTTP response content, which might be 'header' or 'body'. It should be noted that requesting the entire batch takes as long as the longest request, which may increase latency for a request that takes less time. Therefore, it may be advisable to batch similar requests together. It should also be noted that JSON batching might not be ideal for embedding video data, as the video content may need to be serialized into a format that can be embedded in a JSON file.

Another method for grouping requests and responses is called Multipart Batched request format. This method defines a format for packaging multiple, independent HTTP requests into a single multipart MIME (Multipurpose Internet Mail Extensions) payload. The intent is to provide applications with a method of grouping sets of individual HTTP requests for processing as a unit.

The multipart/http media type is a (new) subtype of MIME multipart message in which the body parts are either HTTP request or response messages. A multipart/http message containing HTTP request messages is called a Batch Request. A multipart/http message containing HTTP response messages is called a Batch Response.

Box-structured and hierarchical file format concepts have been widely used for media storage and sharing. The most well-known file formats in this regard are the ISO Base Media File Format (ISOBMFF) and its variants such as MP4 and 3GPP file formats. ISOBMFF allows storage of timely captured audio/visual media streams, called media tracks. The metadata which describes the track is separated from the encoded bitstream itself. The format provides mechanisms to access media data in a codec-agnostic fashion from the file parser perspective.

In files conforming to ISOBMFF, the media data may be provided in one or more instances of MediaDataBox 'mdat', and the MovieBox 'moov' may be used to enclose the metadata for timed media. In some cases, for a file to be operable, presence of both of the 'mdat' and 'moov' boxes may be required. The 'moov' box may include one or more tracks, and each track may reside in one corresponding TrackBox 'trak'. Each track may be associated with a handler, identified by a four-character code, specifying the track type. Video, audio, and image sequence tracks may be collectively called media tracks, and they may contain an elementary media stream. Other track types may include hint tracks and timed metadata tracks.

Tracks may comprise samples, such as audio or video frames. For video tracks, a media sample may correspond to a coded picture or an access unit. A media track may refer to samples (which may also be referred to as media samples) formatted according to a media compression format (and its encapsulation to the ISO-based media file format). A hint track may refer to hint samples containing cookbook instructions for constructing packets for transmission over an indicated communication protocol. A timed metadata track may refer to samples describing referred media and/or hint samples.

ISO/IEC 23001-14 specifies the Partial File Format, which is a generic format for describing an incomplete file, which may, for example, result from receiving the file partially over lossy communication channel(s). The partial file format may be used to document reception of files, regardless of their bitstream format. For generic cases, the format may provide ways for file readers to resynchronize their parsing in case of byte losses. For cases where the documented file derives from ISO/IEC 14496-12, the partial file format may provide additional tools for resynchronization, such as an index of the source file structures and data integrity information. ISO/IEC 23001-14 also specifies the MIME type for the Partial File Format.

The Partial File Format includes the specification of BoxFileIndexBox, which provides a summary of the box hierarchy of a box-structured file. It may contain a set of BoxIndexBox boxes, each of which may describe one top-level box. Each top-level box of the source file may, typically, have zero or one associated BoxIndexBoxes in the BoxFileIndexBox. A FrontPartBox may be contained in a BoxIndexBox. The FrontPartBox may provide a selected number of initial bytes of the content of the box identified by the containing BoxIndexBox. The fileindex MIME parameter may contain one base-64 encoded BoxFileIndexBox, including the box header and contents, and containing at least one BoxIndexBox. The fileindex parameter may be used with any box-structured file (e.g. ISOBMFF or HEIF (High Efficiency Image File Format) file).

A partial file may be defined as a file conforming to the Partial File Format. A partial segment may be defined as a portion of the partial file containing a single PartialSegmentBox and identifying its associated source data. The definition, syntax, and semantics of PartialSegmentBox are specified in the Partial File Format. The PartialSegmentBox is a container for meta-data describing one or more blocks of received data from a given source, missing or corrupted bytes, source, and/or indexing information. There may be several instances of PartialSegmentBox in a partial file. A PartialSegmentBox may comprise boxes describing the source data. A PartialSegmentBox may be required to contain one PartialSegmentHeaderBox containing configuration of the partial segment. The associated source data may be located after or before the PartialSegmentBox, as described by the PartialSegmentLocationBox, and may be encapsulated in one or more PartialDataBox. The SourceURLBox, when present, may be used to indicate a source URL and associated MIME type of the source file. It may be inserted in PartialFileBox or PartialSegmentBox by the receiver, and may be used by a file reader to repair the file.

HTTP has been widely used for the delivery of real-time multimedia content over the Internet, such as in video streaming applications. Several commercial solutions for adaptive streaming over HTTP, such as Microsoft® Smooth Streaming, Apple® Adaptive HTTP Live Streaming, and Adobe® Dynamic Streaming have been launched, and standardization projects have been carried out.

Adaptive HTTP streaming (AHS) was first standardized in Release 9 of 3rd Generation Partnership Project (3GPP) packet-switched streaming (PSS) service (3GPP TS 26.234 Release 9: "Transparent end-to-end packet-switched streaming service (PSS); protocols and codecs"). MPEG took 3GPP AHS Release 9 as a starting point for the MPE-DASH standard (ISO/IEC 23009-1: "Dynamic adaptive streaming over HTTP (DASH)-Part 1: Media presentation description and segment formats"). MPEG-DASH (Dynamic Adaptive Streaming over HTTP) is an adaptive bitrate streaming technique that enables high quality streaming of media content over the Internet, delivered from conventional HTTP web servers.

MPEG-DASH and 3GP-DASH are technically close to each other and may therefore be collectively referred to as DASH. Some concepts, formats, and operations of DASH are described below as an example of a video streaming system, wherein example embodiments of the present disclosure may be implemented. The example embodiments of the present disclosure are not limited to DASH; the description is given as one possible basis on top of which the example embodiments may be partly or fully realized.

In DASH, the multimedia content may be stored on an HTTP server and may be delivered using HTTP. The content may be stored on the server in two parts: Media Presentation Description (MPD), which describes a manifest of the available content, its various alternatives, their URL addresses, and other characteristics; and segments, which contain the actual multimedia bitstreams in the form of chunks, in a single or multiple files. The MPD may provide the necessary information for clients to establish a dynamic adaptive streaming over HTTP. The MPD may contain information describing media presentation, such as an HTTP-uniform resource locator (URL) of each Segment, which may be used to make a GET Segment request.

To play the content, the DASH client may obtain the MPD by using, for example, HTTP, email, thumb drive, broadcast, other transport methods, etc. By parsing the MPD, the DASH client may become aware of the program timing, media-content availability, media types, resolutions, minimum and maximum bandwidths, the existence of various encoded alternatives of multimedia components, accessibility features, required digital rights management (DRM), media-component locations on the network, and/or other content characteristic(s). Using this information, the DASH client may select the appropriate encoded alternative (i.e. a segment, representation, media component, etc.) and start streaming the content by fetching the segments using HTTP GET requests, for example. After appropriate buffering to allow for network throughput variations, the client may continue fetching the subsequent segments and may also monitor the network bandwidth fluctuation(s). The client may decide how to adapt to the available bandwidth by fetching segments of different alternatives (with lower or higher bitrates) to maintain an adequate buffer.

In the context of DASH, the following definitions may be used: A "media content component" or a "media component" may be defined as one continuous component of the media content with an assigned media component type that may be encoded individually into a media stream. "Media content" may be defined as one media content period or a contiguous sequence of media content periods. "Media content component type" may be defined as a single type of media content, such as audio, video, or text. A "media stream" may be defined as an encoded version of a media content component.

In DASH, a hierarchical data model may be used to structure a media presentation, as follows. A media presentation consists of a sequence of one or more Periods, where each Period contains one or more Groups, where each Group contains one or more Adaptation Sets, where each Adaptation Sets contains one or more Representations, where each Representation consists of one or more Segments.

A Group may be defined as a collection of Adaptation Sets that are not expected to be presented simultaneously. An Adaptation Set may be defined as a set of interchangeable encoded versions of one or several media content components. A Representation may be defined as one of the alternative choices of the media content or a subset thereof, which may differ by the encoding choice, such as by bitrate, resolution, language, codec, or the like, for example.

A Segment may contain a certain duration of media data, and metadata to decode and present the included media content. A Segment may be identified by a uniform resource identifier (URI) and may (typically) be requested by an HTTP GET request. A Segment may be defined as a unit of data associated with an HTTP-URL and, optionally, a byte range that are specified by an MPD.

The DASH MPD may comply with Extensible Markup Language (XML) and may therefore be specified through elements and attributes as defined in XML. The MPD may be specified using the following conventions: Elements in an XML document may be identified by an upper-case first letter and may appear in bold face as Element. To express that an element Element1 is contained in another element Element2, one may write Element2.Element1. If an element's name consists of two or more combined words, camel-casing may be used, such as ImportantElement, for example. Elements may be present either exactly once, or the minimum and maximum occurrence may be defined by <minOccurs> . . . <maxOccurs>.

Attributes in an XML document may be identified by a lower-case first letter, and may also be preceded by a '@'-sign, e.g. @attribute, for example. To point to a specific attribute @attribute contained in an element Element, one may write Element@attribute. If an attribute's name consists of two or more combined words, camel-casing may be used after the first word, such as @veryImportantAttribute, for example. Attributes may be assigned a status in the XML as mandatory (M), optional (O), optional with default value (OD), or conditionally mandatory (CM).

In DASH, descriptor elements may be structured in the same way, in that they may contain a @schemeIdUri attribute that provides a URI to identify the scheme, an optional attribute @value, and/or an optional attribute @id. The semantics of the element may be specific to the scheme employed. The URI identifying the scheme may be a uniform resource name (URN) or a URL. Some descriptors may be specified in MPEG-DASH (ISO/IEC 23009-1), while some descriptors may, additionally or alternatively, be specified in other specifications.

When specified in specifications other than MPEG-DASH, the MPD might not provide any specific information on how to use descriptor elements. It may be up to the application or specification that employs DASH formats to instantiate the description elements with appropriate scheme information. Applications or specifications that use one of these elements may define a Scheme Identifier in the form of a URI and the value space for the element when that Scheme Identifier is used. The Scheme Identifier may appear in the @schemeIdUri attribute. In the case that a simple set of enumerated values are required, a text string may be defined for each value and this string may be included in the @value attribute. If structured data is required, then any extension element or attribute may be defined in a separate namespace. The @id value may be used to refer to a unique descriptor or to a group of descriptors. In the latter case, descriptors with identical values for the attribute @id may be required to be synonymous, i.e. the processing of only one of the descriptors with an identical value for @id may be considered sufficient. Two elements of type DescriptorType may be equivalent if the element name, the value of the @schemeIdUri, and the value of the @value attribute are equivalent. If the @schemeIdUri is a URN, then equivalence may refer to lexical equivalence, as defined in clause 5 of RFC 2141. If the @schemeIdUri is a URL, then equivalence may refer to equality on a character-for-character basis, as defined in clause 6.2.1 of RFC3986. If the @value attribute is not present, equivalence may be determined by the equivalence for @schemeIdUri only. Attributes and elements in an extension namespaces might not be used for determining equivalence. The @id attribute may be ignored for equivalence determination.

MPEG-DASH specifies descriptors EssentialProperty and SupplementalProperty. For the element EssentialProperty, the Media Presentation author may express that the successful processing of the descriptor is essential to properly use the information in the parent element that contains this descriptor, unless the element shares the same @id with another EssentialProperty element. If EssentialProperty elements share the same @id, then processing one of the EssentialProperty elements with the same value for @id may be sufficient. It may be expected that at least one EssentialProperty element of each distinct @id value is processed. If the scheme or the value for an EssentialProperty descriptor is not recognized, the DASH client may be expected to ignore the parent element that contains the descriptor. Multiple EssentialProperty elements with the same value for @id and with different values for @id may be present in an MPD.

For the element SupplementalProperty, the Media Presentation author may express that the descriptor contains supplemental information that may be used by the DASH client for optimized processing. If the scheme or the value for a SupplementalProperty descriptor is not recognized, the DASH client may be expected to ignore the descriptor. Multiple SupplementalProperty elements may be present in an MPD.

An Initialization Segment may be defined as a Segment containing metadata that is necessary to present the media streams encapsulated in Media Segments. In ISOBMFF-based segment formats, an Initialization Segment may comprise the Movie Box ('moov') which might not include metadata for any samples, i.e. any metadata for samples may be provided in 'moof' boxes (Movie Fragment Box).

A Media Segment may contain a certain duration of media data for playback at a normal speed; such duration may be referred to as Media Segment duration or Segment duration. The content producer or service provider may select the Segment duration according to the desired characteristics of the service. For example, a relatively short Segment duration may be used in a live service to achieve a short end-to-end latency. The reason for this may be that Segment duration is typically a lower bound on the end-to-end latency perceived by a DASH client, since a Segment is a discrete unit of generating media data for DASH. Content generation may typically be done in such a manner that a whole Segment of media data is made available for a server. Furthermore, many client implementations use a Segment as the unit for GET requests. Thus, in typical arrangements for live services, a Segment may be requested by a DASH client only when the whole duration of Media Segment is available as well as encoded and encapsulated into a Segment. For on-demand service, different strategies of selecting Segment duration may be used.

For example, a Segment may be further partitioned into Subsegments to enable downloading segments in multiple parts. Subsegments may be required to contain complete access units. Subsegments may be indexed by a Segment Index box, which may contain information to map presentation time range and byte range for each Subsegment. The Segment Index box may also describe subsegments and stream access points in the segment by signaling their durations and byte offsets.

A DASH client may use the information obtained from Segment Index box(es) to make an HTTP GET request for a specific Subsegment using byte range HTTP request. If a relatively long Segment duration is used, then Subsegments may be used to keep the size of HTTP responses reasonable and flexible for bitrate adaptation. The indexing information of a segment may be put in the single box at the beginning of that segment, or may be spread among many indexing boxes in the segment. Different methods of spreading are possible, such as hierarchical, daisy chain, and hybrid, for example. This technique may avoid adding a large box at the beginning of the segment, and therefore may prevent a possible initial download delay.

The Initialization Segment and/or the Media Segments and/or the Index Segments may provide sufficient information such that the data may be easily accessed through HTTP partial GET requests. The details on providing such information may be defined by the media format in use. When ISOBMFF Segments are used, the following details may apply: The Initialization Segment may contain the Level Assignment box; The Subsegment Index box ('ssix') may be present for each Subsegment; The attribute @level may specify the level to which the described Sub-Representation may be associated to in the Subsegment Index; The information in Representation, Sub-Representation, and in the Level Assignment ('leva') box may contain information on the assignment of media data to levels; Media data may have an order such that each level provides an enhancement compared to the lower levels.

MPEG-DASH may define segment-container formats for both ISOBMFF and MPEG-2 Transport Streams. Other specifications may specify segment formats based on other container formats. For example, a segment format based on the Matroska container file format has been proposed and may be summarized as follows. When Matroska files are carried as DASH segments or alike, the association of DASH units and Matroska units may be specified as follows: A subsegment (of DASH) may be defined as one or more consecutive Clusters of Matroska-encapsulated content. An Initialization Segment of DASH may be required to comprise the EBML (Extensible Binary Meta Language) header, Segment header (of Matroska), Segment Information (of Matroska) and Tracks, and may optionally comprise other level1 elements and padding. A Segment Index of DASH may comprise a Cues Element of Matroska.

Figure 2:
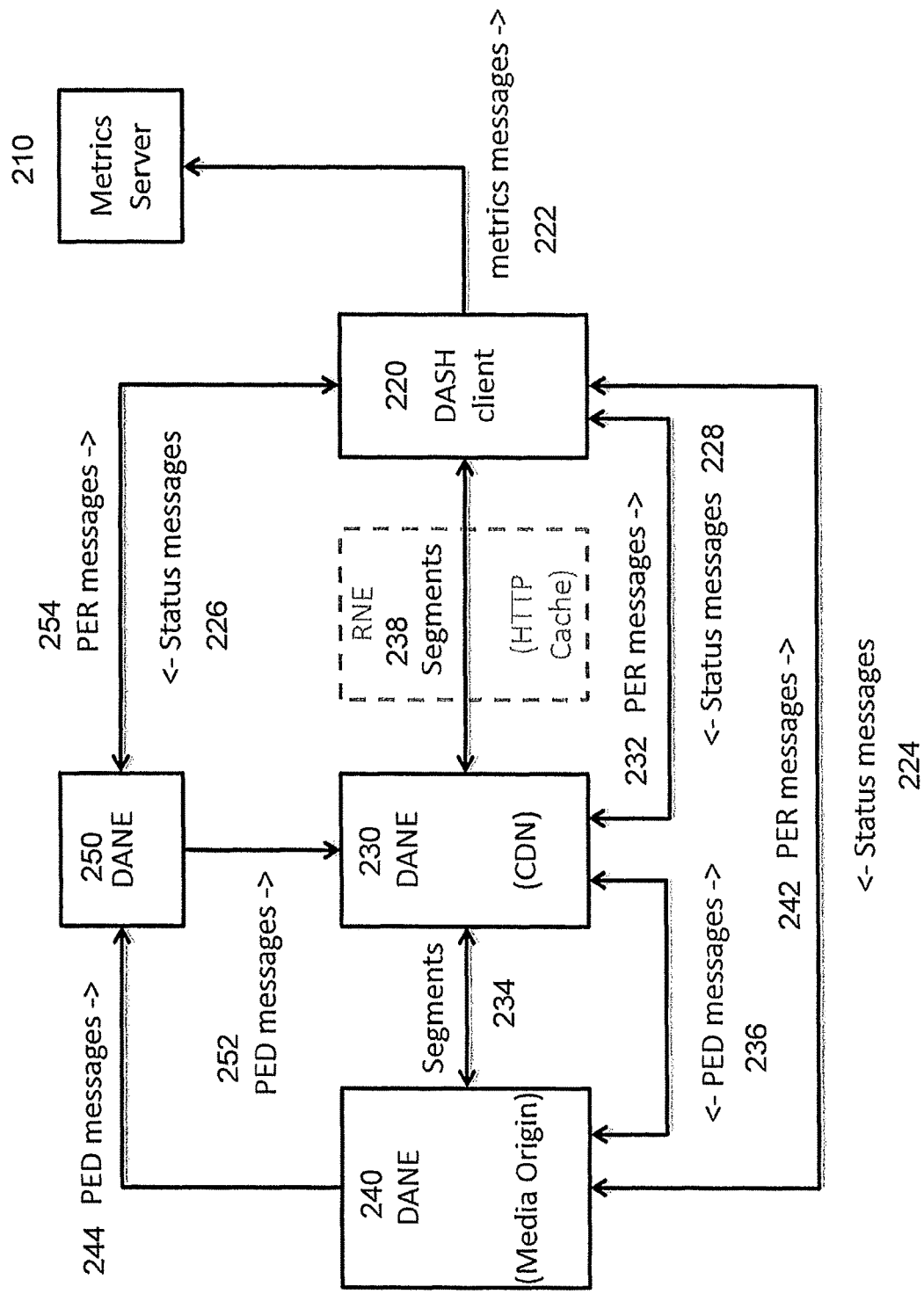
FIG. 2 is a diagram illustrating features as described herein.

ISO/IEC 23009-5 specifies server- and network-assisted DASH (SAND). The SAND reference architecture comprises DASH clients and DASH aware network elements (DANE), which have at least minimum intelligence/information about DASH. Referring now to FIG. 2, illustrated is an example of a SAND network architecture, according to ISO/IEC 23009-5. The following categories of SAND messages may be specified: DANEs (e.g. 230, 240, 250) may exchange Parameters Enhancing Delivery (PED) messages between themselves (e.g. 244, 254, and 236). DANEs (e.g. 230, 240, 250) may send Parameters Enhancing Reception (PER) messages to DASH clients (e.g. DASH client 220) (e.g. PER messages 254, 242, 232). DASH clients (e.g. 220) may send status messages to DANEs (e.g. DANEs 230, 240, and 250) (e.g. status messages 224, 226, 228). DASH clients (e.g. 220) may send metrics messages to Metrics servers (e.g. Metrics server 210) (e.g. metrics messages 222).

A media origin that serves DASH content may also be a DANE that performs either or both of: receive status messages from the clients; and/or send PED parameters/messages to other DANEs. In the example of FIG. 2, DANE 240 may serve as a Media Origin, and may receive status messages 224 from DASH client 220, and may send PED messages 244, 236 to other DANEs 250, 230.

A DANE 240 acting as a Media Origin may exchange segments 234 with a DANE 230 acting as a content delivery network (CDN) server. DANE 230 may exchange segments 238 with DASH client 220. Optionally, these segments 238 may be exchanged via a regular network entity (RNE), which may act as an HTTP cache.

Features as described herein may generally relate to coding of volumetric video data/content. Volumetric video data may represent a three-dimensional scene or object and may be used as input for AR, VR, and/or MR applications. Because volumetric video describes a 3D scene (or object), such data can be viewed from any viewpoint. Therefore, volumetric video is an important format for any AR, VR, or MR applications, especially for providing six degrees of freedom (6DoF) viewing capabilities. Such data may describe geometry (shape, size, position in 3D-space, etc.) and respective attributes (e.g. color, opacity, reflectance, etc.), plus any possible temporal changes of the geometry and attributes at given time instances. Temporal information about the scene may be included in the form of individual capture instances, i.e. "frames" in 2D video, or other means, e.g. position of an object as a function of time.

Volumetric video coding standards, such as ISO/IEC 23090-(V3C) and ISO/IEC 23090-12 (MIV), rely on compression of volumetric content using traditional 2D video codecs. This may be achieved by segmenting an input 3D scene into regions according to heuristics based on, for example, spatial proximity and/or similarity of the data in the region. The segmented regions may be projected into 2D patches, where each patch may contain depth, occupancy, texture, or other attribute channels. The depth channel may contain information, based on which the 3D position of the surface pixels may be determined. The patches may be further packed into video frames that can be compressed and streamed as a regular 2D video.

The associated metadata, i.e. atlas data, contains information about the patch projection (in 3D) and position of patches in video frames (2D). Client or server-side view synthesis is utilized to reconstruct novel 2D views from patches and associated atlas data. Video encoded frames describing the visual and geometric information of the compressed 3D scene may be streamed over network using conventional video distribution technologies, such as DASH. Atlas data may be streamed as an additional timed data track.

MPEG immersive video (MIV) may enable compression of volumetric video for a limited viewing volume, from which novel views of the scene may be synthesized. Thus, the viewer may be able to move within the intended viewing volume with acceptable quality of experience. As the physical size of the viewing volume increases, the amount of data required to store the volumetric information increases as well. This may be partially caused by an increased need to store parallax information, and/or may be partially due to storage of view-dependent lighting information. Other reasons/factors, such as improving the visual quality of experience, may require storing volumetric information in several sub-viewing volumes.

Figure 3:
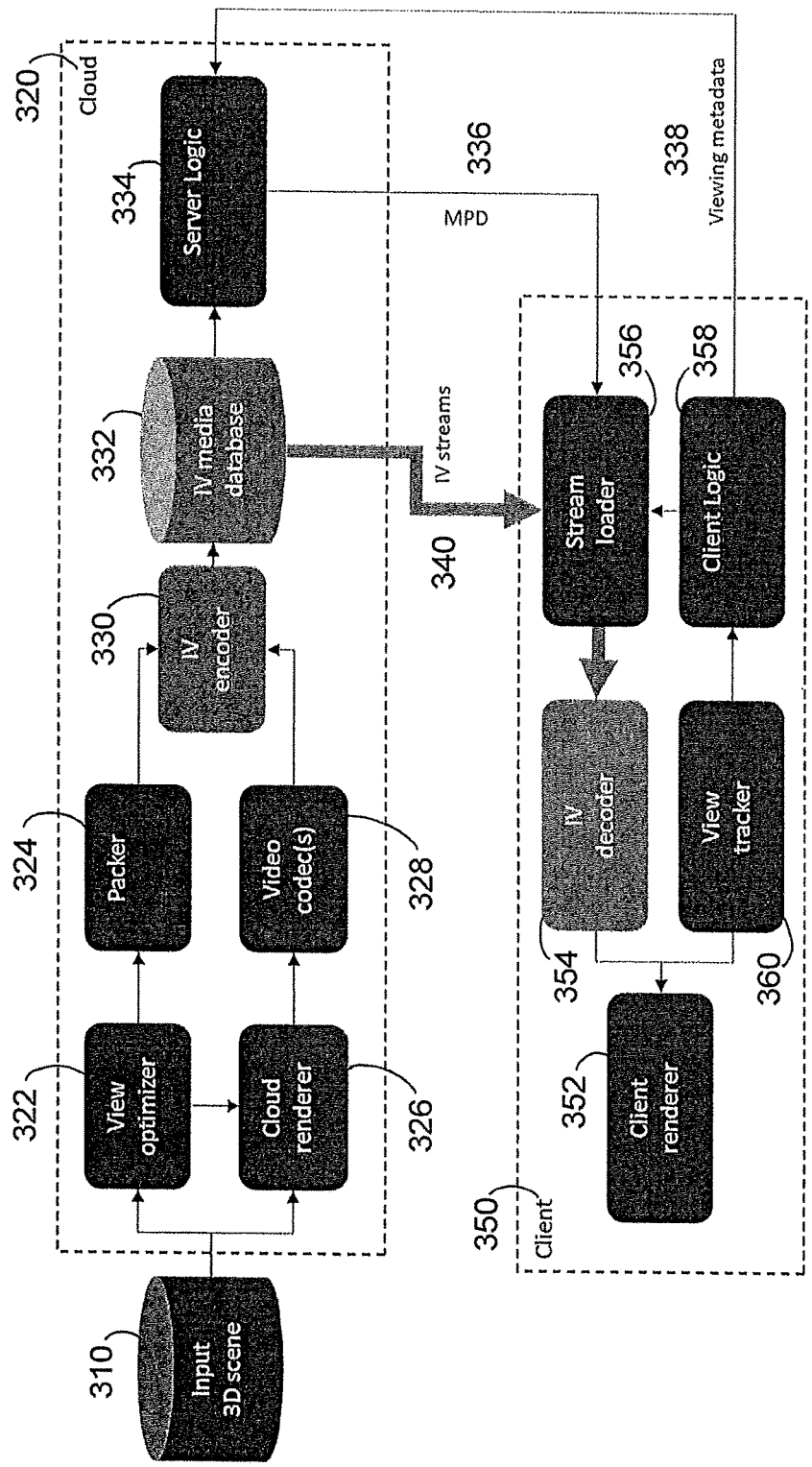
FIG. 3 is a diagram illustrating features as described herein.

Referring now to FIG. 3, illustrated is an exemplary generic pipeline, including pre-processing, compression, decoding, and rendering, according to a visual volumetric video-based coding (V3C), MIV, or video-based point cloud compression (V-PCC) specification, where the application tasks are distributed only among cloud and client. An input 3D scene 310 may be input to a cloud 320 for encoding and packing. A client renderer 352 of a client 350 may render a 3D scene based on the encoded data, transmitted via IV streams 340, and a media presentation description 336 received from the cloud 320.

Basic compression and consumption of a volumetric video scene is illustrated in FIG. 3. Conceptually, both V-PCC and MIV encoding/decoding may follow the same principles. Fundamentally, each frame of the input 3D scene or model may be processed separately. The resulting per-frame video frames and atlas data may then be stored into 2D video and atlas data streams, respectively. Firstly, the input 3D scene may be converted into a canonical representation for processing, e.g. at 310. Depending on the source, the input scene may consist of, for example, a procedurally animated 3D scene, animated 3D meshes, or registered camera views with depth maps. The input may be sampled at an internal processing frame rate and converted into a collection of 3D samples of the scene geometry at a specified internal processing resolution. Depending on the input, this may involve e.g. voxelizing a mesh model, or down-sampling a high resolution point cloud with very fine details into the processing resolution. The internal representation may finally be a collection of scene data points registered in a common 3D scene coordinate system, representing all aspects of the 3D input scene. Example aspects may include, but are not limited to, the color, geometry, and/or surface normals of the 3D scene.

The View-Optimizer, i.e. 322 of FIG. 3, may take the internal representation and create a segmentation of the scene that may be optimized for a specified viewing constraint. This may involve creating view-tiles that have sufficient coverage and resolution for representing the original input scene 310 at minimal quality degradation within the given viewing constraints. The View-Optimizer, 322, may make use of at least the 3D position of the data points in the scene, but additional attributes such as surface normals, colors, material attributes, and/or viewing and capture directions may also be considered.

The resulting view-tiles for one or more sub viewing volumes may then be pre-rendered in the Cloud Rendering stage, i.e. 326. This may involve resampling an input point cloud into 2D tile projections, or calling an external renderer, e.g. a path tracing renderer, to render views of a 3D input scene. For natural camera inputs, virtual views may be synthesized by view interpolation between the original input views, or parts of the input views may be used directly to produce the rendered tiles.

Output from the view optimizer 322 may be packed into 2D frames at 324. Output from the cloud rendering stage 326 may be input to one or more video codecs 328 for encoding. Output of the packer 324 and video codec(s) 328 may be input to an IV encoder 330. Output of the IV encoder 330 may be input to an IV media database, 332, which may provide encoded video frames to a client 350, e.g. via 340. Information from the IV media database may inform server logic 334 of the cloud 320, which may produce media presentation description(s) 336, which may be made available to the client 350.

A client 350 may receive encoded video data and metadata from the cloud 320 and buffer the received information with a stream loader 356. Based on a view tracker 360, client logic 358 may inform the stream loader 356 of what encoded frames are to be decoded in order to provide a desired view of the 3D scene. For example, based on an indicated location and/or orientation of a viewport, one or more frames included in IV streams 340 may be selected for decoding with IV decoder 354. Alternatively or additionally, the client logic 358 of the client 350 may provide viewing metadata 338 to the cloud server logic 334 to indicate what portion(s) of the 3D scene are required by the client.

As defined in ISO/IEC 23090-5, a V3C bitstream may contain one or more atlases. An atlas may consist of an atlas data bitstream (atlas_sub_bitstream( )) and video encoded component bitstream(s) (video_sub_bitstream( ). An atlas data bitstream may carry patch layout information for related video encoded component bitstreams. To support signaling of shared parameter sets across atlases, common atlas data (V3C_CAD) may be utilized. This common atlas data may contain only atlas data bitstream(s) where common parameters, such as view or camera parameters, may be signaled.

Figure 4:
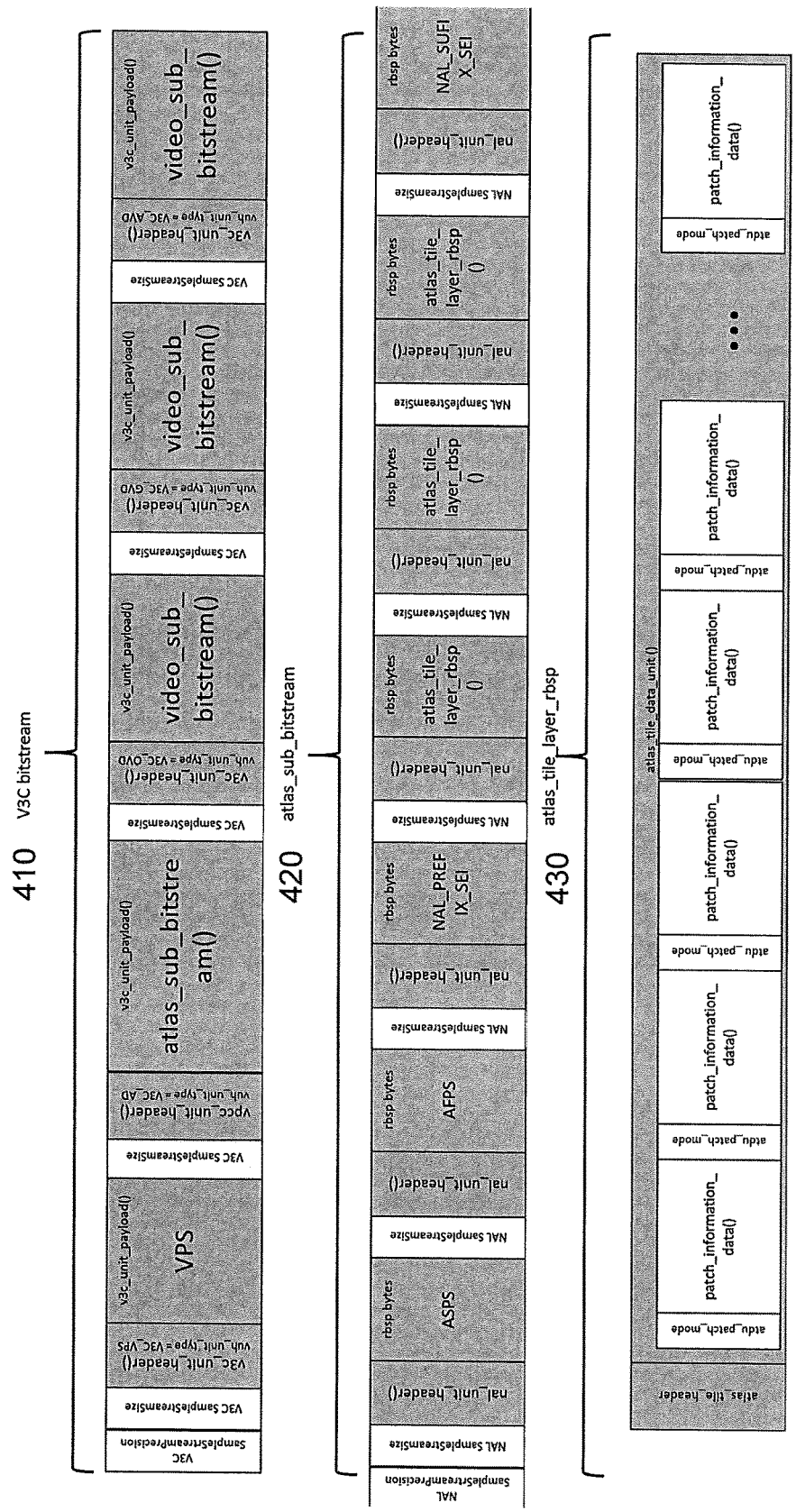
FIG. 4 is a diagram illustrating features as described herein.

Referring now to FIG. 4, illustrated is an example V3C bitstream structure for a single atlas, where atlases are signaled in v3c_unit_headers. The single atlas comprises patch data and video encoded components. V3C bitstream 410 includes an atlas_sub_bitstream 420. The atlas_sub_bitstream 420 includes an atlas_tile_layer_rbsp( ) 430.

In larger volumetric video scenes, the content may be too large for the client to access, decode, and/or render all at once. Larger scenes may, typically, be split into multiple video atlases in any case due to video decoder resolution limits, so it may be desirable to facilitate partial access at the atlas level and/or using smaller partitions such as tiles inside/within atlases.

From a file format perspective, sequences of v3c_units with different headers may be stored in separate tracks. In practice, this may mean that each V3C video component for each atlas is stored in a different track. ISO/IEC 23090-10 enables even more specific partitioning, allowing for storage of tiles in independent V3C atlas tile tracks.

The High Efficiency Video Coding Standard (HEVC) supports highly flexible partitioning of a video sequence. Each frame of the sequence may be split up into rectangular or square regions (e.g. units or blocks), each of which may be predicted from previously coded data. After prediction, any residual information may be transformed and entropy encoded.

Each coded video frame, or picture, may be partitioned into tiles and/or slices, which may be further partitioned into Coding Tree Units (CTUs). The CTU is the basic unit of coding, analogous to the Macroblock in earlier standards, and can be up to 64×64 pixels in size.

A packed video component, in V3C unit type V3C_PVD, may limit the required number of video components in V3C sequence to allow for carrying the patches of other video components (e.g. geometry and texture patches), which are frame packed as a single coded video bitstream.

Information on how to interpret a packed video frame can be provided in a V3C parameter set utilizing the packing_information( ) syntax element. The syntax element may signal the type of regions in the packed frame, as well as where they should be placed in the original video component, when unpacking of the frame is performed.

Features as described herein may relate to an Omnidirectional Media Format (OMAF). 360° video streaming may either be carried out in a viewport-independent or viewport-dependent manner. In viewport-independent 360° video streaming, no picture quality emphasis is given to any spatial part of the video, and the prevailing viewing orientation has no impact on which version of the video content is streamed. Typically, a sequence of projected omnidirectional pictures may be encoded as one or more bitrate or resolution versions, each of which is made available for streaming as a single DASH Representation. A client may select the version that best suits its display resolution and the prevailing throughput.

Since a viewport may cover only a fraction of the omnidirectional video at any time instance, a large portion of the omnidirectional video is not displayed. Thus, network bandwidth may be inefficiently utilized in viewport-independent 360° video streaming. A key idea of viewport-dependent 360° video streaming is to dedicate a large share of the available bandwidth for the video covering the viewport. It has been shown that viewport-dependent streaming may be able to reach a bit rate reduction of several tens of per cents when compared to viewport-independent streaming.

Since there is an inherent delay in the streaming system to react to viewport changes, the spherical video not contained within the viewport may, typically, also be streamed, albeit at a lower bitrate, and thus also at a lower picture quality. Another benefit provided by some viewport-dependent streaming approaches over viewport-independent streaming may be that the sample count may be non-uniformly allocated, with a higher sampling density covering the viewport. Thus, the effective resolution on the viewport may be greater than what the decoding capacity would otherwise support.

There are two basic approaches for achieving viewport-adaptive/dependent operation, namely viewport-specific 360° video streams and tile-based viewport-dependent 360° streaming. In the case of viewport-specific (VS) 360° streams, several 360° streams of the same input video content may be encoded for a pre-defined set of viewport orientations. Each stream may also cover areas other than the targeted viewport, though at lower quality. Moreover, the content may be encoded for several bitrates and/or picture resolutions. The streams may be made available for streaming, and metadata describing the viewports which the streams are aimed for/directed to may be provided. Clients may select the 360° stream that is targeted for their current viewport and that suits the network throughput.

In tile-based viewport-dependent 360° streaming, projected pictures may be encoded as several tiles. A practical approach may be to encode tiles in a manner that they can be merged to a bitstream that can be decoded with a single decoder instance. In the context of viewport-dependent 360° streaming, the term "tile" may refer to an isolated region, which may depend only on the collocated isolated region in reference pictures, and does not depend on any other picture regions. Several versions of the content may be encoded at different bitrates and/or resolutions. Coded tile sequences may be made available for streaming together with metadata describing the location of the tile on the omnidirectional video. Clients may select which tiles are received so that the viewport has higher quality and/or resolution than the tiles outside the viewport.

Different video coding formats may provide different high-level structures for realizing isolated regions, which may be used as elementary units in tile-based viewport-dependent 360° streaming. In the High Efficiency Video Coding standard (HEVC, ITU-T H.265|ISO/IEC 23008-2), a picture may be split into tiles along a grid of tile columns and rows. A slice may be either an integer number of complete tiles, or a subset of a single tile. Coded slices may consist of a slice header and slice data, where the slice header indicates the position of the slice within the picture, among other things. Encoders may choose to use only rectangular slices, keep the tile and slice boundaries unchanged throughout a coded video sequence, and/or constrain the coding mode and motion vector selection so that a slice references only the collocated slices in the reference picture(s). In a common operation mode, a slice may enclose a set of one or more complete tiles, which can be referred to as a motion-constrained tile set (MCTS).

A sub-picture may be defined as a picture that represents a spatial subset of the original video content. Consequently, a sub-picture bitstream may represent a sub-picture sequence. As an alternative to partitioning pictures into tiles and/or slices, pictures may be split prior to encoding into sub-picture sequences. Each sub-picture sequence may be encoded with constraints in the coding modes and motion vectors so that the encoded sub-picture bitstreams may be merged into a single bitstream with multiple tiles.

Each coded tile or sub-picture sequence may, typically, be stored into its own track. A sub-picture track may be defined as a track that contains a sub-picture bitstream and may be decoded with a regular decoding process of advanced video coding (AVC) or HEVC. Slice headers of a sub-picture track may always indicate the sub-picture to appear in the top-left corner of the picture. A tile track may be defined as a track that contains only a coded tile sequence with its original slice header(s), indicating the tile location where it appeared during the encoding. A bitstream may be reconstructed in the form it was encoded by combining the content from all its tile tracks. An HEVC tile-based track may reference HEVC tile tracks in their order in the coded picture, and hence may have the technical effect of facilitating bitstream reconstruction. However, many viewport-dependent streaming approaches may combine tile tracks originating from several bitstreams, which may require rewriting of parameter sets and slice headers.

The Omnidirectional MediA Format (OMAF, ISO/IEC 23090-2) supports both author-driven and late tile binding approaches. In author-driven tile binding, the processing that requires knowledge of the video coding format may be performed by content authors and OMAF players may follow instructions created as a part of the content authoring process to merge tiles. In late tile binding, OMAF players may rewrite high-level syntax structures of a video bitstream to merge tiles.

An OMAF-based track may be defined as a track that provides instructions to reconstruct a single video bitstream by merging samples of the referenced tile or sub-picture tracks. An OMAF-based track may be an HEVC tile-based track or an extractor track. Extractor tracks are specified in the ISOBMFF encapsulation format of HEVC and AVC bitstreams (ISO/IEC 14496-15). In author-driven tile binding, an extractor track may serve as a prescription for OMAF players as to how tiles may be merged from other tracks. An extractor track may also contain rewritten parameter sets and slice headers, since they cannot, typically, be inherited from the referenced tracks.

When late tile binding is targeted/intended, the OMAF-based track may, typically, be an HEVC tile-based track, thanks to its low byte count overhead. However, it may be noted that even if extractor tracks were provided by the content author, an OMAF player could choose to ignore them and perform late tile binding.

In late tile binding, an OMAF player may select the tiles to be received and merge them into a single video bitstream. Late tile binding may give OMAF players freedom to, for example, select the field of view for the viewport, but may also require more sophisticated client-side processing compared to author-driven tile binding.

Several versions of the content at different resolutions, and possibly for different bitrates or different random access point periods, may be encoded. The tile tracks that have the same resolution and are collocated may be encapsulated into the same track group to indicate that they are alternatives, out of which players should choose at most one track. The same tile dimensions may, typically, be used across all resolution versions to simplify merging of tile tracks in any order.

In late tile binding, an OMAF player may perform the following operations for bitstream rewriting: (1) The parameter sets in the Initialization Segment in the main Adaptation Set may be used as the basis, but may need to be modified according to the selected tile Adaptation Set(s). (2) The spatial location of a slice in the merged bitstream may differ from its location in the encoded bitstream, and when it does differ, rewriting of the slice header may be needed. (3) Removal and insertion of the start code emulation prevention bytes may be needed, depending on the rewritten syntax structures of parameter set(s) and slice header(s).

In tile-based viewport-dependent 360° streaming, the number of Representations may be relatively high, even up to hundreds of Representations, since the content may be partitioned into several tens of tiles and may be coded with several resolutions and bitrates. Moreover, the duration of (Sub)Segments may be inconveniently long to update the viewport quickly with high-quality tiles after a viewing orientation change. Thus, requests having a finer granularity than (Sub)Segments may be desirable. To enable fine-grained requests, even down to a single picture interval, and to obtain the indexing data conveniently for all tiles, OMAF v2 includes new segment formats, including Initialization Segment for an OMAF base track, Tile Index Segment, and Tile Data Segment.

The Initialization Segment for an OMAF-based track may contain the track header for the OMAF-based track and all the referenced tile or sub-picture tracks. This may have the technical effect of allowing the client to download only the Initialization Segment for the OMAF-based track, without the need to download the Initialization Segment(s) of the referenced tile or sub-picture tracks.

The Tile Index Segment may logically be an Index Segment, as specified in the DASH standard. It may contain SegmentIndexBoxes for the OMAF-based track and all the referenced tile or sub-picture tracks, and may be required to include MovieFragmentBoxes for the OMAF-based track and all the referenced tile or sub-picture tracks. MovieFragmentBoxes may indicate the byte ranges on a sample basis. Consequently, a client may choose to request content on smaller units than (Sub)Segments.

The Tile Data Segments may be Media Segments containing only media data enclosed in IdentifiedMediaDataBoxes ('imda'). The byte offsets contained in MovieFragmentBoxes ('moof') may be relative to the start of IdentifiedMediaDataBoxes. Thus, MovieFragmentBoxes and media data may reside in separate resources, unlike in conventional DASH segment formats, where the byte offsets to the media data are relative to the MovieFragmentBox. The box payload of each IdentifiedMediaDataBox starts with a sequence number that may also be contained in the corresponding MovieFragmentBox, thus enabling pairing/matching a MovieFragmentBox with the corresponding IdentifiedMediaDataBox.

It may be noted that time-aligned Segments of different tile or sub-picture tracks may share the same URL. Consequently, a single HTTP GET request, potentially with multiple byte ranges, may be used to access time-aligned (Sub)Segments of several tile or sub-picture tracks. Alternatively, when Tile Index Segments are in use, a client may determine which samples of tile or sub-picture tracks are merged in the tile binding process and may issue an HTTP GET request with multiple byte ranges covering these samples. A server may respond to an HTTP GET request with multiple byte ranges using a multipart payload that contains one part per each byte range in the request. More details of HTTP range requests and responses are available in IETF RFC 7233.

Many modern video streaming applications require streaming of several video tracks and metadata in parallel. Examples of such applications include V3C- and OMAF-based (esp. overlays and multi-planar content) streaming solutions. Adaptation and streaming strategies for solutions which require several video tracks become more complex as the number of video tracks and different alternatives increase. For a V3C application, the number of valid combinations of alternative tracks may increase exponentially (number_of_alternatives$^{number\_of\_tracks}$). Pre-packaging every possible combination may quickly become a wasteful strategy. However, it is not typical that all combinations make sense to include. Accordingly, Playout Groups were introduced to ISO/IEC 23090-10 to define which alternatives should be played together.

In general, video tracks may be fragmented into smaller segments to accommodate bitrate or other adaptation requirement(s). Videos may be streamed segment by segment as the client monitors the streaming conditions and requests alternative versions which optimally satisfy stream adaptation requirements. As the segment duration decreases, so does the switching latency between alternatives. This means that sequences with short segment duration are faster to adapt to bandwidth or other changes. Segment duration may be considered when serving viewpoint dependent content, where user viewport may be used as a metric to decide which alternatives should be prioritized.

It may be noted that short segment duration, in combination with multiple parallel video tracks, may impact the ratio of HTTP payload and HTTP header information. Currently, DASH requires requesting segments for each track individually, which may mean that several parallel HTTP requests are made. For applications which require streaming of multiple parallel video tracks, which also require fast adaptation to bandwidth or other adaptation criteria, this may mean generation of potentially wasteful HTTP request overhead.

DASH specification ISO/IEC 23009-1 defines the following limitations:

" . . . The Media Presentation Description (MPD) describes a Media Presentation, i.e. a bounded or unbounded presentation of continuous media content. In particular, it defines formats to announce resource identifiers for Segments and to provide the context for these identified resources within a Media Presentation. These resource identifiers are HTTP-URLs possibly combined with a byte range, or with a data URL.

The Segment formats specify the formats of the entity body of the HTTP response to an HTTP GET request or a partial HTTP GET with the indicated byte range using HTTP/1.1 as defined in IETF RFC 7233 to a resource identified in the MPD. Segments typically contain efficiently coded media data and metadata conforming to or at least closely aligned with common media formats . . . "

According to a non-limiting example, a V3C bitstream may contain 2 atlases with 4 tiles each. The bitstream may contain attribute, geometry, and occupancy video components. Each video component may be encoded in three different qualities. The Segment duration may be 500 ms. In such an example, pre-packaging video files and requesting each segment separately may result in sending 64 HTTP requests in a second. In V3C, where alternatives may be combined fairly freely, pre-encapsulation may result in a non-trivial number of different valid combinations. Without Playout Groups, there may be 324 valid combinations of video tracks, which may make pre-packaging different adaptation combinations practically impossible. Such issues may increase in severity where encrypted HTTPS requests are introduced, as encryption introduces additional overhead on top of HTTP. Standard DASH solutions may not be suitable for addressing issues associated with multiple valid alternative combinations of segments and/or high HTTP overhead resulting from multiple HTTP requests. Example embodiments of the present disclosure may have the technical effect of reducing HTTP(S) overhead for modern video streaming applications.

Example embodiments of the present disclosure may rely on small scale edge-processing for encapsulating information in a single response, which may typically require several responses and requests. In other words, multiple responses may be aggregated into a single response, or a fewer number of responses.

Example embodiments of the present disclosure may allow retrofitting of HTTP response packing into existing DASH-based pipeline(s). Example embodiments of the present disclosure may involve defining DASH-level signaling that describes the capability to pack HTTP responses in a single payload. New signaling for format of requesting packed payloads, as well as receiving them, may also be defined in example embodiments of the present disclosure.

In an example embodiment, a method and DASH signaling for an entity that enables combining HTTP requests for two or more media segments into one or more HTTP responses may be defined.

In another example embodiment, MPD signaling defining support for packing two or more media segment requests into one or more HTTP response may be defined.

In another example embodiment, MPD signaling defining format of request and response packing may be defined.

In another example embodiment, a SAND+DANE-based system for processing batched requests and responses may be defined.

In another example embodiment, a method for using a single HTTP request to fetch media data from two or more DASH adaptation sets may be defined. A HTTP GET request with URI may involve defining new URI parameter(s). A HTTP Post with different payload format(s) may be defined. A HTTP Multipart Batched request format may be defined.

In another example embodiment, a method for packing two or more HTTP responses, containing DASH media segments from multiple adaptation sets, into one or more HTTP responses may be defined. The responses may be packed using a custom payload. The responses may be packed by creating archives, e.g. with zip or tar. The responses may be packed as a multipart batch response. The responses may be packed into a single ISOBMFF file or another video file format. A partial file format ISO/IEC 23001-14 may be suitable where video fragments represent parts of the same ISOBMFF file. A box sequence may be formed from the top-level boxes of the requested segments, and the formed box sequence may be transmitted. The requested segments may be packed, using a tile binding mechanism, into a single video bitstream, and the formed video bitstream may be transmitted. The packing may be performed, for example, by an entity on the cloud. In a case where occupancy, geometry, and/or attributes are a sub-picture of versatile video coding (VVC), a server may pack sub-pictures into one frame and re-write ISOBMFF to contain the packed track (as defined in ISO/IEC 23090-5 2nd edition).

Figure 5:
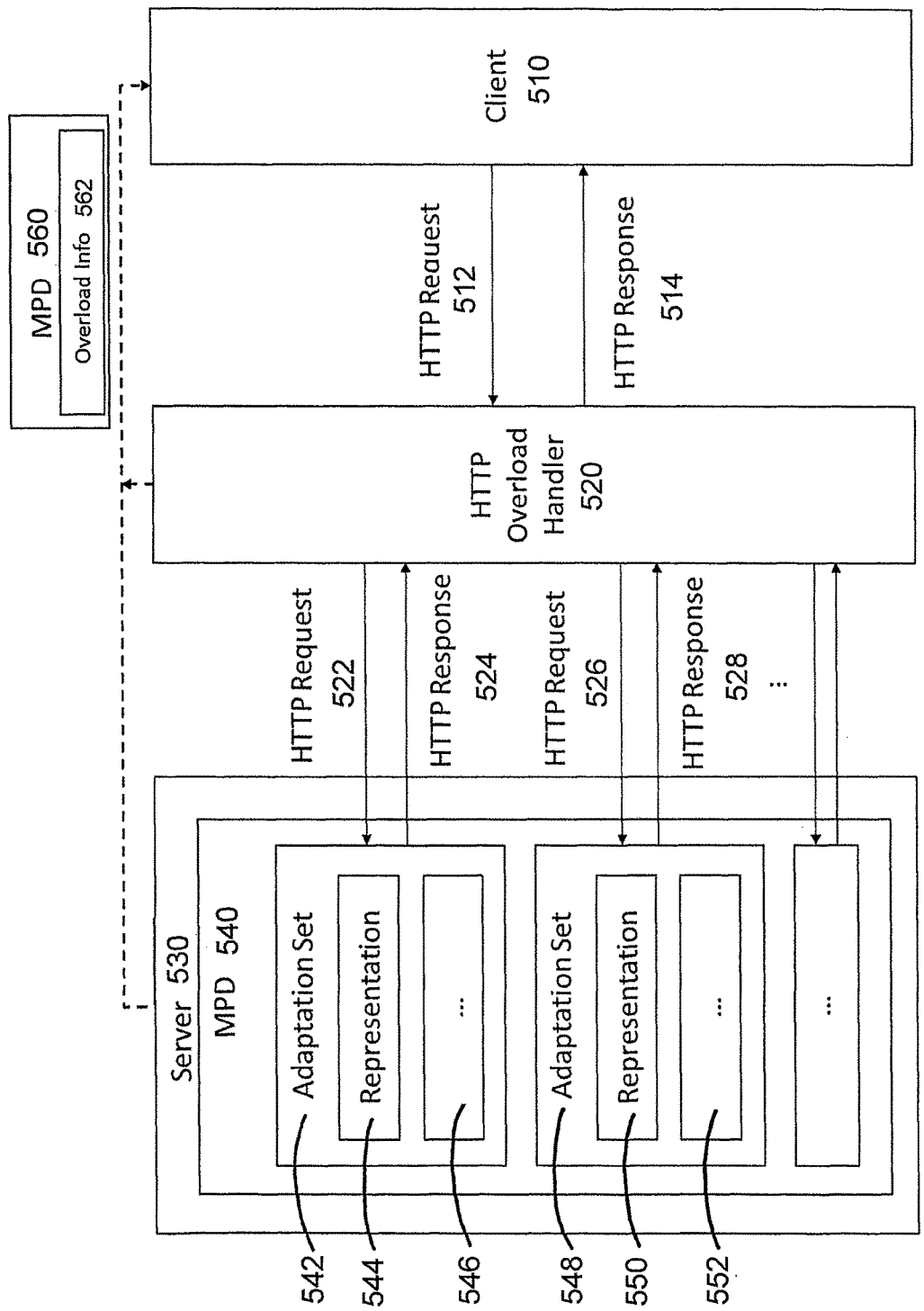
FIG. 5 is a diagram illustrating features as described herein.

Referring now to FIG. 5, illustrated is a diagram of an example data flow with an edge server enabling multipart segment requests. An HTTP overload handler 520 may be an entity that understands an HTTP(S) request 512 signaling to, for example, fetch more than one media segment from more than one adaptation set (e.g. 542, 548, etc.). HTTP overload handler 520 may exist on an edge server that may intermediate between client 510 and server 530. Alternatively, HTTP overload handler 520 may be located on the same device as server 530. A server 530 may be an HTTP server that serves media segments as well as MPD files, e.g. MPD 540, describing the available content. The available content described by MPD 540 may include description of one or more adaptations sets (e.g. 542, 548, etc.). The adaptation sets may include one or more representations (e.g. 544, 546, 550, 552, etc.). The representations may include segments containing (coded) media data and metadata. The server 530 may provide an MPD 560 to a client 510. The MPD 560 may contain MPD 540 as well as additional information, e.g. overload info 562, which may indicate the capability and format for HTTP overloading supported by the HTTP overload handler 520. Furthermore, overload info 562 may contain additional information regarding the presence of an edge server, such as URL(s) or a request overloading scheme supported by the edge server on which the HTTP overload handler resides.

In one example embodiment, an edge server may contain an implementation of HTTP overload handler 520, which may provide additional functionalities and may allow the client 510 to request media segments in bundles instead of using multiple single HTTP requests. An edge server may be chosen as an implementation of the HTTP overload handler 520 in order to take advantage of existing streaming architectures and benefit from server-side caching with no changes to server 530, (i.e. only updating of the MPD 560, e.g. to include overload info 562, may be required).

In another example embodiment, the functionality associated with HTTP overload handler 520 may be implemented by/using a middleware server component on the same physical device as the server 530 itself.

In MPD 560, a new overload info 562 SupplementalProperty element may be signaled at MPD level. SupplementalProperty may have a unique @schemeIdURI, e.g. urn:mpeg:dash:http-overload:2020. The HTTPOverload descriptor may contain attributes as defined in Table 1 below. For example, the descriptor may at least define whether an edge server supports HTTP overloading, and may provide a URL for such an edge server, if needed (see @edge-server-url). Signaling the HTTP overload request and response type may also be supported, e.g. indicate whether POST or GET requests are supported and what kind of response packing is supported (see @requestType, @responseType). The HTTP overload handler 520 may provide/transmit the overload info 562, which may include one or more elements as described, to the client 510 with MPD 560. The HTTP overload handler functionality, e.g. of 520, may determine what overload info 562 to include in MPD 560.

Table 1 provides example HTTPOverload descriptor definitions:

TABLE 1

| Elements and Attributes for HTTPOverload descriptor | Use | Data type | Description |
| --- | --- | --- | --- |
| @edge-server-url | O | xs: string | If defined, provides URL of an edge server, which supports http overloading. |
| @requestType | CM | xs:UIntVectorType | If http-overload descriptor exists, @requestType contains a vector of values that describe which kind of overloading is supported by target system. Table 2 may be used to decode the values. |
| @responseType | CM | xs:UIntVectorType | If http-overload descriptor exists, @responseType contains a vector of values that describe which kind of responses may be requested from the target system. Table 3 may be used to decode the values. |

Table 2 contains example value definitions for HTTPOverload descriptor scheme attribute, i.e. overload descriptor @requestType definition. A vector may be requested from the HTTP overload handler 520 that includes one or more of the following values:

TABLE 2

| value | Description |
| --- | --- |
| 1 | Backend supports GET URL parameter based overloading |
| 2 | Backend supports POST body JSON format |
| 3 | Backend supports POST body XML format |
| 4 | Backend supports custom POST body format |
| 5 | Backend supports multipart batched request format |
| . . . | . . . |

After receiving the MPD 560, a client 510 that understands the HTTP overload info 562 might not have to generate separate HTTP GET requests for each needed/required media segment in each Adaptation Set (e.g. 542, 548, etc.). Instead, client 510 may create a single HTTP request 512 with information on which representations and segments are needed (e.g. overloaded HTTP request). Separate requests may be packed in a single overloaded HTTP request based on the @requestType attribute in HTTPOverload descriptor.

The HTTP request 512 may be formatted according to a vector of values associated with a @requestType element included in the overload info 562. The HTTP request 512 may include an indication of a format according to which the HTTP Response 514 may be constructed by the HTTP overload handler 520. Such a format may be selected by the client 510 according to a @responseType element included in the overload info 562.

In an example embodiment, the HTTP request 512 may be signaled as one or more URL parameters for GET request(s). Normally, a client might send separate GET requests for each video segment it requires. For example, the client may request depth, texture, occupancy and/or metadata segment(s), contained in different adaptation sets, from the server as follows:
GET http://example.com/asset_1/as_id_1/repr_id_1/seg_1
GET http://example.com/asset_1/as_id_2/repr_id_1/seg_1
GET http://example.com/asset_1/as_id_3/repr_id_1/seg_1
GET http://example.com/asset_1/as_id_4/repr_id_1/seg_1

In this example, the client 510 may request the "same" segment (e.g. "seg_1") from the "same" representation (e.g. "repr_id_1") in different adaptation sets (e.g. "as_id_1" "as_id_2", "as_id_3", "as_id_4"). In an example, the adaptation sets may not be expected to be presented simultaneously.

With the proposed functionality (HTTPOverload@requestType=1), the client may send only one request, which may list how many assets are requested and how they can be identified from DASH MPD 540, and what response type is expected:
GET http://example-overload-handler.com/asset_1?overload=4?responseType=1&as_id=1&repr_id=1&seg_id=1&as_id=2&repr_id=1&seg_id=1&as_id=3&repr_id=1&seg_id=1&as_id=4&repr_id=1&se g_id=1

In this example, four segments are requested, according to an indication that the backend supports GET URL parameter-based overloading (see Table 2), to be delivered to the client 510 according to a multipart batch response payload format (see Table 3).

In a non-limiting example presented for explanatory purposes, the client 510 may receive an MPD 560 comprising overload info 562 including a @requestType element indicating that the backend (e.g. HTTP Overload Handler 520) supports GET URL parameter-based overloading and a @responseType element indicating that a multipart batch response payload format is supported. The client 510 may send/transmit an HTTP request 512 according to the supported @requestType element and indicate a selected @responseType element. The HTTP overload handler 520 may, based on the HTTP request 512, transmit a HTTP request 522 to request a segment of a representation (e.g. 544, 546, etc.) of an adaptation set 542 of MPD 540 from the server 530. In response, the HTTP overload handler 520 may receive an HTTP response 524. The HTTP overload handler 520 may, based on the HTTP request 512, transmit a HTTP request 526 to request a segment of a representation (e.g. 550, 552, etc.) of an adaptation set 548 of MPD 540 from the server 530. In response, the HTTP overload handler 520 may receive an HTTP response 528. The example of FIG. 5 is not limiting; the HTTP overload handler 520 may transmit fewer or more HTTP requests to the server 530, and may receive fewer or more HTTP responses from the server 530. Based on the HTTP responses (e.g. 524, 528, etc.) received and, optionally, the @responseType element selected by the client 510, the HTTP overload handler 520 may prepare an HTTP response 514 including multiple segments bundled/packed together. The HTTP overload handler 520 may transmit/send this HTTP response to the client 510.

In an example embodiment, the HTTP request 512 may be signaled in a POST message body. The body may contain payload structured in a self-describing data format, such as JSON, XML, or in any other format. The request types included in Table 2 are not limiting; additional formats may occur to a person of ordinary skill in the art.

In an example embodiment, multiple requests may be merged into a single request using a multipart batch request format. The HTTP request 512 may be a bundled request used to request multiple different segments from server 530.

In an example embodiment, the HTTP request 512 may also contain other information to be signaled to the edge server/component (i.e. HTTP overload handler 520) to enable further processing by the edge component, such as bandwidth, viewing orientation, or other information that may be useful to decide what content should be streamed back to the client 510, or for analytics. In other words, the client 510 may transmit one or more parameters to the HTTP overload handler 520 that are configured to enable the HTTP overload handler 520 to determine one or more HTTP requests (e.g. 522, 526, etc.) to make to the server 530.

HTTP overload handler 520 may identify overloaded requests requiring multiple media segments from one or more clients such as, but not limited to, client 510. The HTTP overload handler 520 may parse the overloaded HTTP request(s) 512 and re-use cached media segment(s) for response(s) when possible. For example, HTTP overload handler 520 may retrieve media segment(s) from media storage (same or different network or physical device), remote cache, other remote location(s), or from local storage or cache. If a requested segment is not cached, the HTTP overload handler 520 may retrieve that segment from server 530. In other words, the HTTP overload handler 520 might only retrieve a segment from server 530 if not cached elsewhere; if the segment is cached, the HTTP overload handler 520 might not transmit an HTTP request to the server 530 for the segment.

In an example embodiment, if HTTP overload handler 520 is implemented in a different server from the content server 530, new HTTP(S) requests (522, 526, etc.) may be generated in the network to fetch each requested media segment, for example when cached data is not available locally. Each generated media request may be tagged by the HTTP overload handler so that the requested payloads may be combined before returning the responses to the client 510. The HTTP overload handler 520 might not construct and transmit HTTP response 514 until/unless all requested segments have been received from local storage, server 530, or a combination of locations. Once all the requested segments have been received by the HTTP overload handler 520, the HTTP overload handler 520 may bundle all the segments together in an overloaded HTP response (e.g. 514) according to a supported and/or selected response type. If less than all the requested segments have been received/accessed by the HTTP overload handler 520, the HTTP overload handler may not generate HTTP response 514.

In an example embodiment, the HTTP overload handler 520 may perform HTTP response construction and/or transmission according to an asynchronous response return model, where parts of the (overloaded) HTTP response payload may be returned before all media is available. This may be beneficial if part of the media content is accessed from local storage media while part is fetched from a remote content storage. In other words, the HTTP response 514 may be generated and transmitted even if not all requested segments have been received/accessed by the HTTP overload handler 520. The method may require maintaining a database of media segment sizes on the HTTP overload handler 520, so response payload data size may be determined and the response may be initiated before all data is available. The response may be kept alive while waiting for all media to become available.

HTTP overload handler 520 may (optionally) generate packed/overloaded responses according to one or more @responseType indicated/included in the request 512. Different packing types/payload formats are described in Table 3, which describes various HTTPOverload @responseType definitions:

TABLE 3

| value | Description |
|---|---|
| 1 | Supports multipart batch response payload |
| 2 | Supports zipped response payload format |
| 3 | Supports tarred response payload format |
| 4 | Supports partial ISOBMFF response payload format |
| 5 | Supports an ISOBMFF box sequence payload containing a set of Segments |
| 6 | Supports OMAF late binding response payload format |
| 7 | Supports packed video response payload format (as defined in ISO/IEC 23090-5 2nd edition) |
| 8 | Supports byte range response payload format |
| ... | ... |

In an example embodiment, requested media segments may be packed into a single multipart response (i.e. containing more than one segment according to a supported format).

In an example embodiment, multiple requested media segments may be packed into an archive (zip or tar) format by the HTTP overload handler 520 to form a single HTTP response 514. The archived file may contain each (requested) media segment which, upon unpacking on/by the client 510, may be directly fed to one or more video decoders. The naming of the packed media segments may be according to MPD 560 so that a proper video decoder buffer may be identified. Archived payloads may be further compressed using compression techniques supported by the archives, e.g. DEFLATE.

In an example embodiment, multiple requested media segments may be packed into a partial ISOBMFF container by the HTTP overload handler 520 to form a single HTTP response 514. The performed packing may comprise creating and including one or more PartialSegmentBoxes into the HTTP response 514. The performed packing may further comprise creating and including a SourceURLBox into a PartialSegmentBox, where the SourceURLBox may document the URL of the segment that is contained in the PartialSegmentBox.

In an example embodiment, multiple requested media (sub)segments of different Representations may be concatenated into a single box sequence.

In an example embodiment, late-binding may be performed, similarly to OMAF, by the HTTP overload handler 520, to form a single HTTP response 514. Coded video data from multiple media segments may be consolidated into a single media frame by rewriting slice headers of encoded bitstreams.

In an example embodiment, packed video, as defined in ISO/IEC 23090-5 2nd edition, may be constructed by the HTTP overload handler 520 to generate a single video frame, which may contain data from multiple video components (i.e. from multiple adaptations sets and/or representations).

In an example embodiment, multiple media segments may be packed into a single bitstream container by defining byte-ranges for each media segment in the payload. Byte-ranges for each media segment may be stored by the HTTP overload handler 520 in the first bytes of the packed/overloaded response (i.e. 514) to enable parsing of the single bitstream container by the client 510.

In an example embodiment, a DANE may perform some or all of the functions of HTTP overload handler 520 as described above. In an example embodiment, instead of overload info 560, a SAND message (e.g. OverloadedRequestCapability) may be specified to indicate the DANE's capability for handling overloaded requests. The message may contain one or more parameters, which may indicate which type(s) of overloaded requests a DANE supports. In an example embodiment, a DANE may create and send an OverloadedRequestCapability message. Referring now to FIG. 2, in an example, DANE 230 may transmit an OverloadedRequestCapability message to DASH client 220. In an example embodiment, a client (e.g. 220) may receive an OverloadedRequestCapability message and conclude/determine from it that a server can handle overloaded requests. Thus, the client may issue an overloaded request of multiple media segments to the DANE (e.g. 230).

In an example embodiment, instead of overload info 560, a SAND message (e.g. PackedResponseCapability) may be specified to indicate a DANE's capability for creating packed responses. The message may contain one or more parameters, which may indicate which type(s) of packed responses a DANE supports. In an example embodiment, a DANE may create and send a PackedResponseCapability message to a client. In an example embodiment, a client may receive a PackedResponseCapability message and conclude/determine from it that a server can send packed responses. Thus, the client may issue an overloaded request of multiple media segments to the DANE, to be packed according to a capability of the DANE indicated in the PackedResponseCapability message.

In an example embodiment, when an origin server (e.g. DANE 240) does not support overloaded requests, the intermediate server, such as a CDN edge server (e.g. DANE 230), may split an incoming overloaded request into several ordinary HTTP requests, which may be issued towards to the origin server (e.g. DANE 240). When an overloaded request is split into several ordinary HTTP requests, or when the origin server does not support packed responses, the intermediate server may combine the HTTP responses from the origin server into a single packed response (e.g. 238), as described in other example embodiments.

In an example embodiment, a SAND message (e.g. AcceptPackedResponse) may be specified to indicate client's capability to receive and process packed responses.

The message may contain one or more parameters, which may indicate which type(s) of packed responses the client supports. In an example embodiment, a client may create and send an AcceptPackedResponse message. In an example embodiment, a DANE, such as an origin server (e.g. 240) or a CDN edge server (e.g. 230), may receive an AcceptPackedResponse message and conclude/determine from it that the client (e.g. 220) accepts packed responses. In an example embodiment, when the client indicates support for packed responses, the server may create packed responses in response to overloaded requests.

In an example embodiment, when the client does not indicate support for packed responses, or indicates no support for packed responses, the server may create "ordinary" HTTP response(s) in response to overloaded request(s). In other words, a client may transmit/send a single overloaded/packed request and receive, in response, multiple "ordinary" HTTP responses.

In an example embodiment, when the client indicates support for packed responses, the server may create packed responses in response to a set of two or more "ordinary" HTTP requests. In other words, a client may transmit/send multiple "ordinary" HTTP requests and receive a single overloaded/packed response in return.

In the present disclosure, "ordinary" is used to mean "not overloaded," "not packed," or containing a request for a single (sub)segment, or containing a single (sub)segment.

The signaling discussed in the present disclosure may allow requesting of media segments in any (accepted) format and receiving them in any (desired/indicated) format. A client may, for example, request content using a multipart request format and receive a single ISOBMFF file containing all requested media segments in response. Other combinations of request format and response format may occur to a person of ordinary skill in the art.

Figure 6:
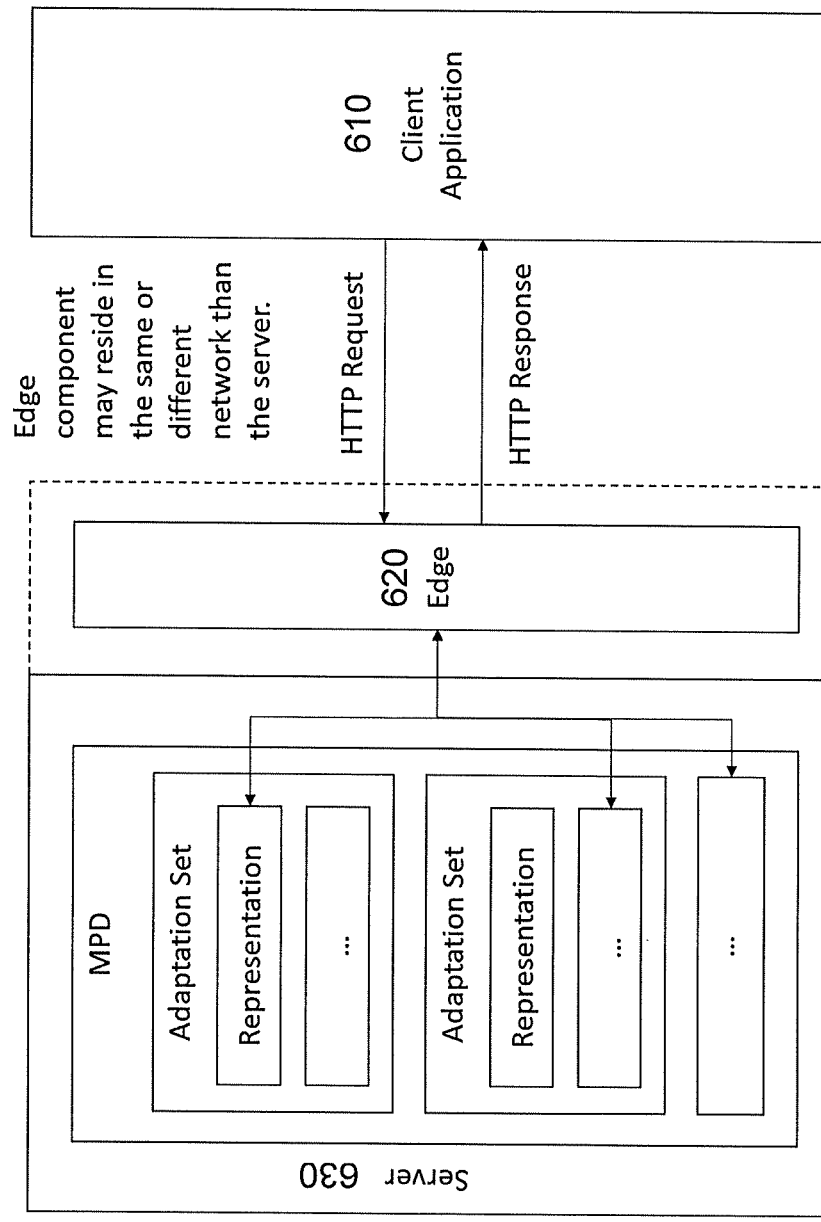
FIG. 6 is a diagram illustrating features as described herein.

Referring now to FIG. 6, illustrated is an example data flow where the client application 610 may directly perform transmission of HTTP request(s) and receipt of HTTP response(s), similar to the Client 510 described with reference to FIG. 5. In the example of FIG. 6, edge 620 may perform the functionality of HTTP overload handler 520 described with reference to FIG. 5. The edge component 620 may reside in the same network as server 630, or may reside in a different network. Overlapping description is omitted.

Figure 7:
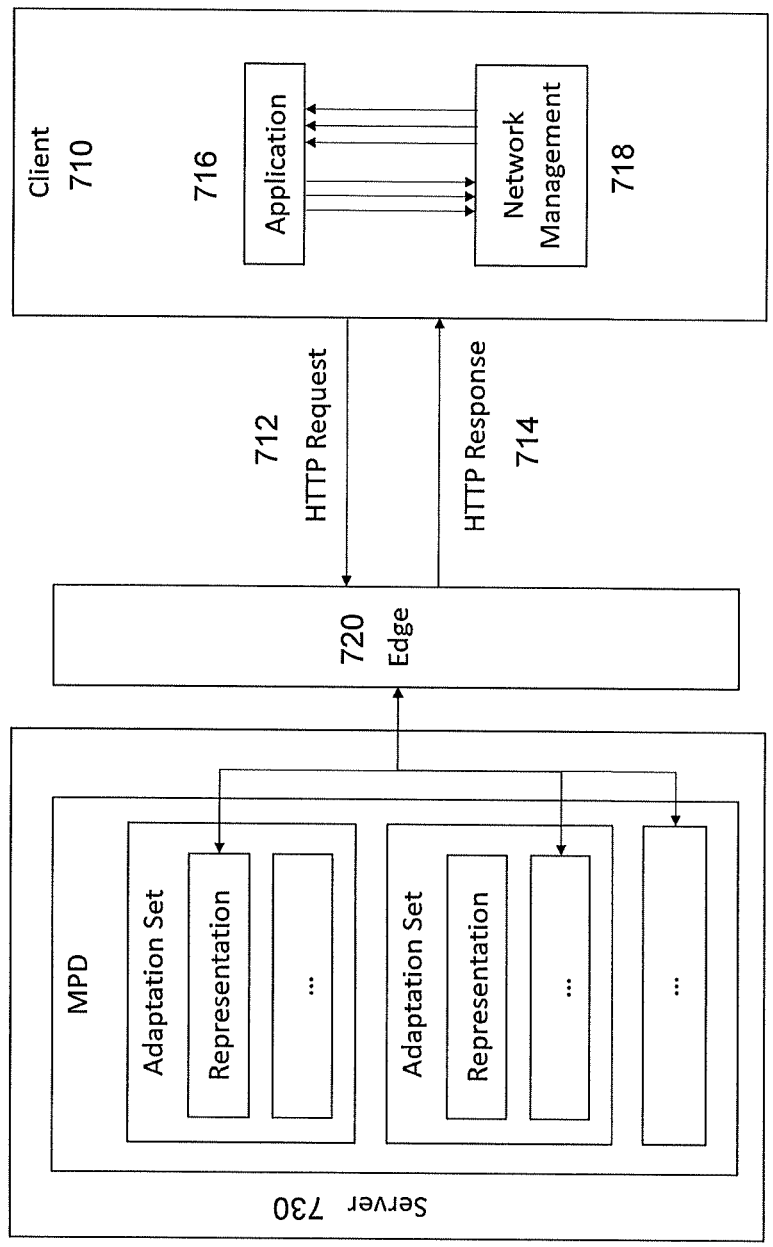
FIG. 7 is a diagram illustrating features as described herein.

Referring now to FIG. 7, illustrated is an example data flow where the client 710 may comprise an application module 716 and a network management module 718. The (dedicated) network management module 718 may intersect/receive/interpret HTTP requests on the client 710 for/from the application module 716. For example, the application module 716 may transmit one or more requests for segments to the network management module 718. The network management module 718 may bundle/package together multiple requests into a packed/overloaded HTTP request 712, which it may transmit to the edge server/component 720. The edge server/component 720 may perform the functionality of HTTP overload handler 520 described with reference to FIG. 5. Overlapping description is omitted.

The network management module 718 may also be capable of receiving an HTTP response 714 from the edge server/component 720, and may be able to parse the bundled/packed/overloaded contents of the HTTP response 714 into one or more segments requested by the application module 716. The network management module 718 may then transmit the one or more segments to the application module 716, which may decode the segments or transmit the segments to a decoder.

Figure 8:
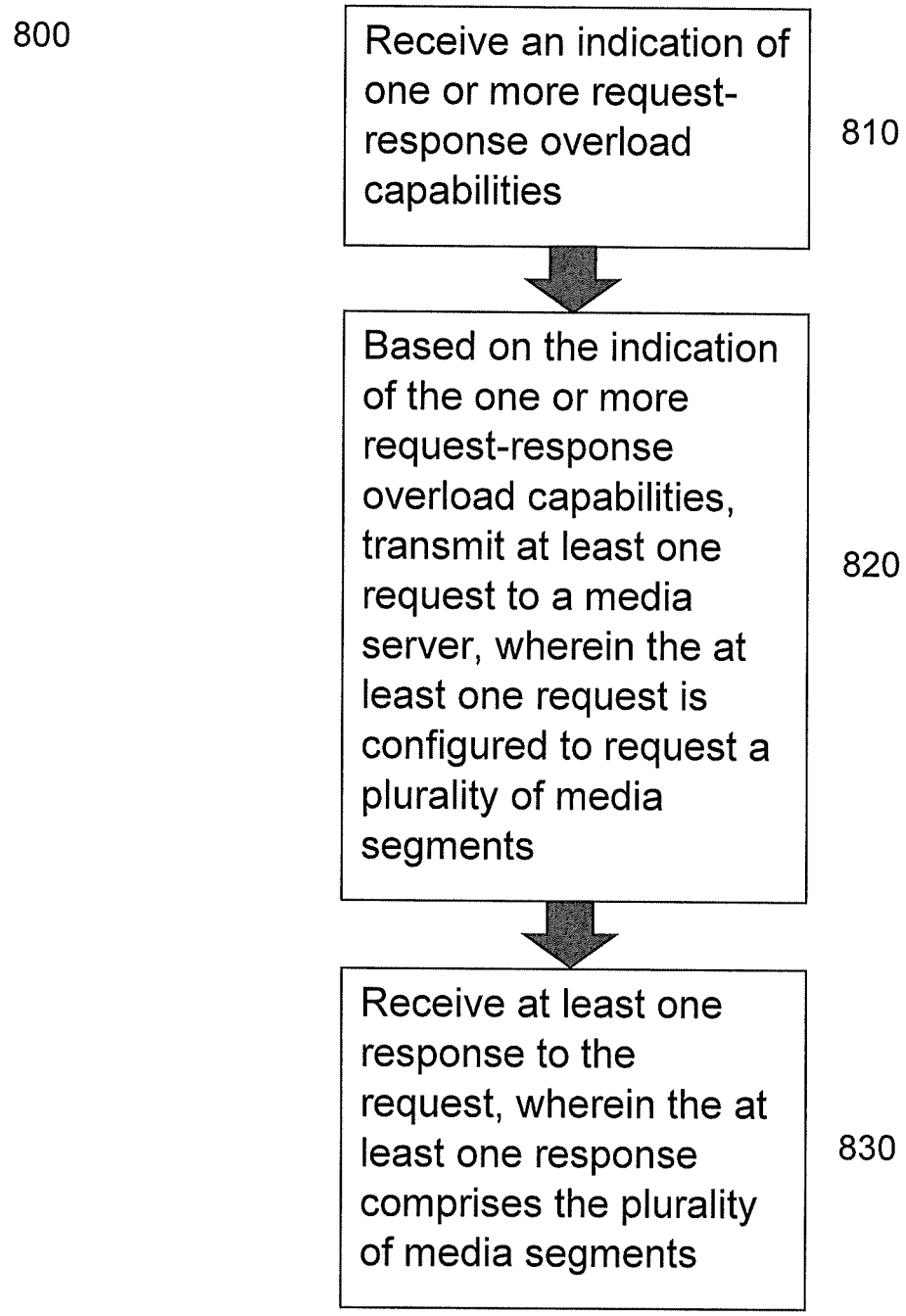
FIG. 8 is a flowchart illustrating steps as described herein.

FIG. 8 illustrates the potential steps of an example method 800. The example method 800 may include: receiving an indication of one or more request-response overload capabilities, 810; based on the indication of the one or more request-response overload capabilities, transmitting at least one request to a media server, wherein the at least one request is configured to request a plurality of media segments, 820; and receiving at least one response to the request, wherein the at least one response comprises the plurality of media segments, 830. The media segments may be from multiple tracks, where tracks may be sequences of encoded media segments that are represent in a DASH manifest as a Representation in an Adaptation Set. The media segments may be video, audio, timed metadata, or other temporal information compressed into a bitstream. The request-response overload capabilities may indicate that request overloading, response overloading, or both request overloading and response overloading are supported by a media server or an overload handler associated with the media server. The example method 800 may be performed with a client, client application, network management module associated with an application of a client, a DASH client, etc.

Figure 9:
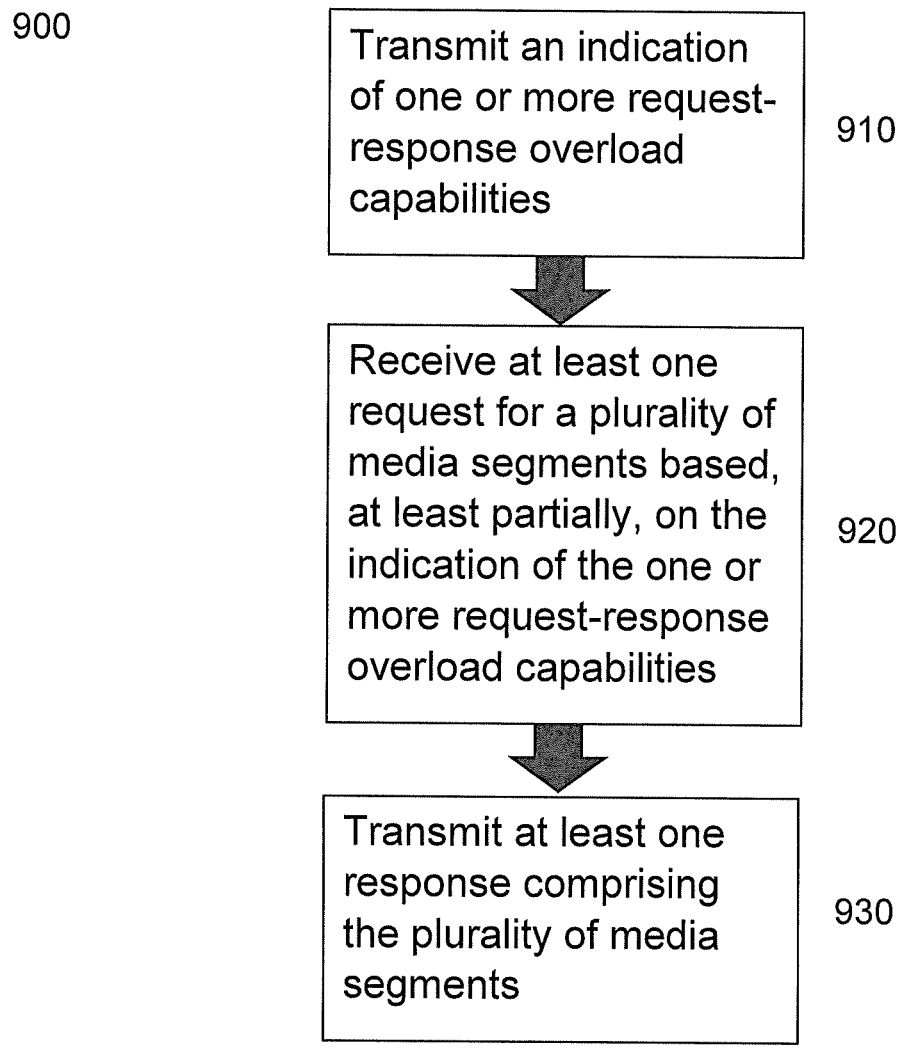
FIG. 9 is a flowchart illustrating steps as described herein.

FIG. 9 illustrates the potential steps of an example method 900. The example method 900 may include: transmitting an indication of one or more request-response overload capabilities, 910; receiving at least one request for a plurality of media segments based, at least partially, on the indication of the one or more request-response overload capabilities, 920; and transmitting at least one response comprising the plurality of media segments, 930. The example method 900 may be performed with a media server, an HTTP overload handler, an edge server, a DANE, etc.

A technical effect of example embodiments of the present disclosure may be to reduce the HTTP overhead, which may be significant when segment sizes are reduced and multiple tracks are streamed in parallel. A technical effect of example embodiments of the present disclosure may be that that example embodiments may be retro-fitted into existing DASH streaming video pipelines. A technical effect of example embodiments of the present disclosure may be that larger files download faster. A technical effect of example embodiments of the present disclosure may be that sending one chunk, instead of many small ones, may allow client and server to divide the data as they see fit given the network conditions. A technical effect of example embodiments of the present disclosure may be that a Maximum Transmission Unit (MTU) may be more optimally filled, thus increasing payload to header ratio.

In accordance with one aspect, an example method may be provided comprising: receiving, with a user equipment, an indication of one or more request-response overload capabilities; based on the indication of the one or more request-response overload capabilities, transmitting at least one request to a media server, wherein the at least one request may be configured to request a plurality of media segments; and receiving, from the media server, at least one response to the request, wherein the at least one response may comprise the plurality of media segments.

A media segment of the plurality of media segments may comprise at least one of: video metadata, audio metadata, timed metadata, or temporal information, wherein the media segment of the plurality of media segments may be compressed into a bitstream.

The media server may comprise one of: a dynamic adaptive streaming over hypertext transfer protocol-aware network element, an edge server, an edge processor, an overload handler, a hypertext transfer protocol overload handler, or a content delivery network element.

The media server may comprise the hypertext transfer protocol overload handler, wherein the hypertext transfer protocol overload handler may be separate from the media server.

The plurality of media segments may comprise at least a first encoded media segment from a first adaptation set and a second encoded media segment from a second adaptation set, wherein the first adaptation set may be different from the second adaptation set.

The indication of the one or more request-response overload capabilities may comprise at least one of: an indication that the media server supports overloading, a uniform resource locator of the media server, an indication of one or more request formats the media server supports, or an indication of one or more response formats the media server supports.

The indication of the one or more request formats the media server supports may include an indication of at least one of: a uniform resource locator parameter based overloading format, a JavaScript object notation format, an extensible markup language format, a custom format, or a multipart batched request format.

The indication of the one or more response formats the media server supports may include an indication of at least one of: a multipart batch response payload format, a zipped response payload format, a tarred response payload format, a partial ISOBMFF response payload format, an ISO base media file format box sequence payload format, an omnidirectional media format late binding response payload format, a packed video response payload format, or a byte range response payload format.

The at least one request may comprise a format type supported by the media server.

At least one of the at least one request may comprise an indication of one or more selected response formats, wherein the at least one received response may comprise at least one response according to one of the one or more selected response formats.

The example method may further comprise: packing a plurality of hypertext transfer protocol requests into an overloaded request, wherein the transmitting of the at least one request to the media server may comprise transmitting the overloaded request to the media server.

The indication of the one or more request-response overload capabilities may comprise an indication of a supported request format, wherein the packing may be based, at least partially, on the supported request format.

The at least one transmitted request may comprise a single overloaded request, wherein the receiving of the at least one response may comprise receiving a plurality of separate responses configured to individually deliver a respective single media segment of the plurality of media segments.

The at least one request may comprise a hypertext transfer protocol overloaded request.

The transmitting of the at least one request may comprise transmitting a plurality of separate requests configured to individually request a respective single media segment of the plurality of media segments, wherein at least one of the plurality of separate requests may be configured to request that the at least one received response comprise a single overloaded response.

The at least one response may comprise a hypertext transfer protocol overloaded response.

The example method may further comprise: unpacking the hypertext transfer protocol overloaded response to separate the plurality of media segments.

The example method may further comprise: providing the received plurality of media segments to one or more decoders.

The at least one response may comprise a single response comprising the plurality of media segments, wherein the single response may comprise at least one of: a zip archive, a tar archive, a multipart batch response, an ISO base media file format file, a multipart segment response, a box sequence, or a video stream packed using tile binding.

The transmitting of the at least one request and the receiving of the at least one response may be performed with a network management module.

The plurality of media segments may comprise at least one of: media segments from different adaptation sets, or media segments from different representations.

The plurality of media segments may comprise media segments from multiple tracks, wherein a track of the multiple tracks may comprise a sequence of encoded media segments that are represented in a dynamic adaptive streaming over hypertext transfer protocol manifest as a representation in an adaptation set.

The example method may further comprise: receiving a media presentation description associated with the plurality of media segments.

The user equipment may comprise one of: a dynamic adaptive streaming over hypertext transfer protocol-aware client, a client application, or a network management module of a client.

The at least one request may comprise an indication of at least one of: a bandwidth, or viewing orientation.

The receiving of the indication of the one or more request-response overload capabilities may comprise one of: receiving an overload information message, or receiving a server- and network-assisted dynamic adaptive streaming over hypertext transfer protocol message.

In accordance with one example embodiment, an apparatus may comprise: at least one processor; and at least one memory including computer program code; the at least one memory and the computer program code configured to, with the at least one processor, cause the apparatus to: receive an indication of one or more request-response overload capabilities; based on the indication of the one or more request-response overload capabilities, transmit at least one request to a media server, wherein the at least one request is configured to request a plurality of media segments; and receive, from the media server, at least one response to the request, wherein the at least one response may comprise the plurality of media segments.

A media segment of the plurality of media segments may comprise at least one of: video metadata, audio metadata, timed metadata, or temporal information, wherein the media segment of the plurality of media segments may be compressed into a bitstream.

The media server may comprise one of: a dynamic adaptive streaming over hypertext transfer protocol-aware network element, an edge server, an edge processor, an overload handler, a hypertext transfer protocol overload handler, or a content delivery network element.

The media server may comprise the hypertext transfer protocol overload handler, wherein the hypertext transfer protocol overload handler may be separate from the media server.

The plurality of media segments may comprise at least a first encoded media segment from a first adaptation set and a second encoded media segment from a second adaptation set, wherein the first adaptation set may be different from the second adaptation set.

The indication of the one or more request-response overload capabilities may comprise at least one of: an indication that the media server supports overloading, a uniform resource locator of the media server, an indication of one or more request formats the media server supports, or an indication of one or more response formats the media server supports.

The indication of the one or more request formats the media server supports may include an indication of at least one of: a uniform resource locator parameter based overloading format, a JavaScript object notation format, an extensible markup language format, a custom format, or a multipart batched request format.

The indication of the one or more response formats the media server supports may include an indication of at least one of: a multipart batch response payload format, a zipped response payload format, a tarred response payload format, a partial ISOBMFF response payload format, an ISO base media file format box sequence payload format, an omnidirectional media format late binding response payload format, a packed video response payload format, or a byte range response payload format.

The at least one request may comprise a format type supported by the media server.

At least one of the at least one request may comprise an indication of one or more selected response formats, wherein the at least one received response may comprise at least one response according to one of the one or more selected response formats.

The example apparatus may be further configured to: pack a plurality of hypertext transfer protocol requests into an overloaded request, wherein transmitting the at least one request to the media server may comprise transmitting the overloaded request to the media server.

The indication of the one or more request-response overload capabilities may comprise an indication of a supported request format, wherein the packing is based, at least partially, on the supported request format.

The at least one transmitted request may comprise a single overloaded request, wherein receiving the at least one response may comprise receiving a plurality of separate responses configured to individually deliver a respective single media segment of the plurality of media segments.

The at least one request may comprise a hypertext transfer protocol overloaded request.

Transmitting the at least one request may comprise transmitting a plurality of separate requests configured to individually request a respective single media segment of the plurality of media segments, wherein at least one of the plurality of separate requests may be configured to request that the at least one received response comprise a single overloaded response.

The at least one response may comprise a hypertext transfer protocol overloaded response.

The example apparatus may be further configured to: unpack the hypertext transfer protocol overloaded response to separate the plurality of media segments.

The example apparatus may be further configured to: provide the received plurality of media segments to one or more decoders.

The at least one response may comprise a single response comprising the plurality of media segments, wherein the single response may comprise at least one of: a zip archive, a tar archive, a multipart batch response, an ISO base media file format file, a multipart segment response, a box sequence, or a video stream packed using tile binding.

Transmitting the at least one request and receiving the at least one response may be performed with a network management module of the apparatus.

The plurality of media segments may comprise at least one of: media segments from different adaptation sets, or media segments from different representations.

The plurality of media segments may comprise media segments from multiple tracks, wherein a track of the multiple tracks may comprise a sequence of encoded media segments that are represented in a dynamic adaptive streaming over hypertext transfer protocol manifest as a representation in an adaptation set.

The example apparatus may be further configured to: receive a media presentation description associated with the plurality of media segments.

The apparatus may comprise one of: a dynamic adaptive streaming over hypertext transfer protocol-aware client, a client application, or a network management module of a client.

The at least one request may comprise an indication of at least one of: a bandwidth, or viewing orientation.

Receiving the indication of the one or more request-response overload capabilities may comprise the example apparatus may be further configured to: receive an overload information message, or receive a server- and network-assisted dynamic adaptive streaming over hypertext transfer protocol message.

In accordance with one example embodiment, an apparatus may comprise: circuitry configured to perform: receive an indication of one or more request-response overload capabilities; based on the indication of the one or more request-response overload capabilities, transmit at least one request to a media server, wherein the at least one request is configured to request a plurality of media segments; and receive, from the media server, at least one response to the request, wherein the at least one response may comprise the plurality of media segments.

In accordance with one example embodiment, an apparatus may comprise: processing circuitry; memory circuitry including computer program code, the memory circuitry and the computer program code configured to, with the processing circuitry, enable the apparatus to: receive an indication of one or more request-response overload capabilities; based on the indication of the one or more request-response overload capabilities, transmit at least one request to a media server, wherein the at least one request is configured to request a plurality of media segments; and receive, from the media server, at least one response to the request, wherein the at least one response may comprise the plurality of media segments.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In accordance with one example embodiment, an apparatus may comprise means for performing:receiving an indication of one or more request-response overload capabilities; based on the indication of the one or more request-response overload capabilities, transmitting at least one request to a media server, wherein the at least one request may be configured to request a plurality of media segments; and receiving, from the media server, at least one response to the request, wherein the at least one response may comprise the plurality of media segments.

A media segment of the plurality of media segments may comprise at least one of: video metadata, audio metadata, timed metadata, or temporal information, wherein the media segment of the plurality of media segments may be compressed into a bitstream.

The media server may comprise one of: a dynamic adaptive streaming over hypertext transfer protocol-aware network element, an edge server, an edge processor, an overload handler, a hypertext transfer protocol overload handler, or a content delivery network element.

The plurality of media segments may comprise at least a first encoded media segment from a first adaptation set and a second encoded media segment from a second adaptation set, wherein the first adaptation set may be different from the second adaptation set.

The indication of the one or more request-response overload capabilities may comprise at least one of: an indication that the media server supports overloading, a uniform resource locator of the media server, an indication of one or more request formats the media server supports, or an indication of one or more response formats the media server supports.

The indication of the one or more request formats the media server supports may include an indication of at least one of: a uniform resource locator parameter based overloading format, a JavaScript object notation format, an extensible markup language format, a custom format, or a multipart batched request format.

The indication of the one or more response formats the media server supports may include an indication of at least one of: a multipart batch response payload format, a zipped response payload format, a tarred response payload format, a partial ISOBMFF response payload format, an ISO base media file format box sequence payload format, an omnidirectional media format late binding response payload format, a packed video response payload format, or a byte range response payload format.

The at least one request may comprise a format type supported by the media server, wherein at least one of the at least one request may comprise an indication of one or more selected response formats, wherein the at least one received response may comprise at least one response according to one of the one or more selected response formats.

The means may be further configured to perform:packing a plurality of hypertext transfer protocol requests into an overloaded request, wherein the means configured to perform transmitting of the at least one request to the media server may comprise means configured to perform transmitting the overloaded request to the media server.

The indication of the one or more request-response overload capabilities may comprise an indication of a supported request format, wherein the packing may be based, at least partially, on the supported request format.

The at least one transmitted request may comprise a single overloaded request, wherein the receiving of the at least one response may comprise receiving a plurality of separate responses configured to individually deliver a respective single media segment of the plurality of media segments.

The transmitting of the at least one request may comprise transmitting a plurality of separate requests configured to individually request a respective single media segment of the plurality of media segments, wherein at least one of the plurality of separate requests may be configured to request that the at least one received response comprise a single overloaded response.

The at least one received response may comprise an overloaded response, wherein the means may be further configured to perform: unpacking the overloaded response to separate the plurality of media segments.

The means may be further configured to perform: providing the received plurality of media segments to one or more decoders.

The overloaded response may comprise at least one of: a zip archive, a tar archive, a multipart batch response, an ISO base media file format file, a multipart segment response, a box sequence, or a video stream packed using tile binding.

The plurality of media segments may comprise at least one of: media segments from different adaptation sets, or media segments from different representations.

The plurality of media segments may comprise media segments from multiple tracks, wherein a track of the multiple tracks may comprise a sequence of encoded media segments that are represented in a dynamic adaptive streaming over hypertext transfer protocol manifest as a representation in an adaptation set.

The means may be further configured to perform: receiving a media presentation description associated with the plurality of media segments.

The means configured to perform receiving of the indication of the one or more request-response overload capabilities may comprise means configured to perform one of: receiving an overload information message, or receiving a server- and network-assisted dynamic adaptive streaming over hypertext transfer protocol message.

In accordance with one example embodiment, a non-transitory computer-readable medium comprising program instructions stored thereon which, when executed with at least one processor, cause the at least one processor to: receive an indication of one or more request-response overload capabilities; based on the indication of the one or more request-response overload capabilities, transmit at least one request to a media server, wherein the at least one request may be configured to request a plurality of media segments; and receive, from the media server, at least one response to the request, wherein the at least one response may comprise the plurality of media segments.

In accordance with another example embodiment, a non-transitory program storage device readable by a machine may be provided, tangibly embodying a program of instructions executable by the machine for performing operations, the operations comprising: receive an indication of one or more request-response overload capabilities; based on the indication of the one or more request-response overload capabilities, transmit at least one request to a media server, wherein the at least one request may be configured to request a plurality of media segments; and receive, from the media server, at least one response to the request, wherein the at least one response may comprise the plurality of media segments.

In accordance with one aspect, an example method may be provided comprising: transmitting, from an overload handler to a client, an indication of one or more request-response overload capabilities; receiving, from the client, at least one request for a plurality of media segments based, at least partially, on the indication of the one or more request-response overload capabilities; and transmitting, to the client, at least one response comprising the plurality of media segments.

A media segment of the plurality of media segments may comprise at least one of: video metadata, audio metadata, timed metadata, or temporal information, wherein the media segment of the plurality of media segments may be compressed into a bitstream.

The overload handler may comprise one of: a dynamic adaptive streaming over hypertext transfer protocol-aware network element, an edge server, an edge processor, an overload handler, a hypertext transfer protocol overload handler, or a content delivery network element.

The overload handler may be located on a same device as a server configured to store at least the plurality of media segments.

The plurality of media segments may comprise at least a first encoded media segment from a first adaptation set and a second encoded media segment from a second adaptation set, wherein the first adaptation set may be different from the second adaptation set.

At least one of the plurality of media segments may be stored in at least one of: a remote cache, a local cache, a local memory, a remote memory, a media storage on a same device as the overload handler, or a media storage on a device separate from the overload handler.

The indication of the one or more request-response overload capabilities may comprise at least one of: an indication that the overload handler supports overloading, an indication of a uniform resource locator of the overload handler, an indication of one or more supported request formats the overload handler supports, or an indication of one or more supported response formats the overload handler supports.

The indication of the one or more request formats the overload handler supports may include an indication of at least one of: a uniform resource locator parameter based overloading format, a JavaScript object notation format, an extensible markup language format, a custom format, or a multipart batched request format.

The indication of the one or more response formats the overload handler supports may include an indication of at least one of: a multipart batch response payload format, a zipped response payload format, a tarred response payload format, a partial ISOBMFF response payload format, an ISO base media file format box sequence payload format, an omnidirectional media format late binding response payload format, a packed video response payload format, or a byte range response payload format.

The at least one request may comprise a request of a supported request format.

The at least one request may comprise a plurality of requests configured to request single media segments of the plurality of media segments.

The at least one request may comprise one overloaded request.

The at least one response may comprise a plurality of responses configured to deliver single media segments of the plurality of media segments.

The at least one response may comprise one overloaded response.

The example method may further comprise: packing the plurality of segments in the one overloaded response.

The example method may further comprise: packing a plurality of hypertext transfer protocol responses into an overloaded response, wherein the transmitting of the at least one response may comprise transmitting the overloaded response.

The at least one request may comprise an indication of a selected response format, wherein the packing is based, at least partially, on the supported response format.

The at least one response may comprise a single response comprising the plurality of media segments, wherein the single response may comprise at least one: a zip archive, a tar archive, a multipart batch response, an ISO base media file format file, a multipart segment response, a box sequence, or a video stream packed using tile binding.

The plurality of media segments may comprise at least one of: media segments from different adaptation sets, or media segments from different representations.

The plurality of media segments may comprise media segments from multiple tracks, wherein a track of the multiple tracks may comprise a sequence of encoded media segments that are represented in a dynamic adaptive streaming over hypertext transfer protocol manifest as a representation in an adaptation set.

The example method may further comprise: transmitting, to a content server, one or more requests for one or more of the plurality of media segments; and receiving the one or more requested media segments from the content server.

The example method may further comprise: transmitting, to the client, a media presentation description associated with the plurality of media segments.

The client may comprise one of: a dynamic adaptive streaming over hypertext transfer protocol-aware client, a client application, or a network management module.

The at least one request may comprise an indication of at least one of: a bandwidth, or viewing orientation.

The transmitting of the indication of the one or more request-response overload capabilities may comprise one of: transmitting an overload information message, or transmitting a server- and network-assisted dynamic adaptive streaming over hypertext transfer protocol message.

The transmitting of the at least one response may comprise generating the at least one response according to an asynchronous response return model.

At least one of the at least one request may comprise an indication of one or more selected response formats, wherein the transmitted at least one response may comprise a response according to one of the one or more selected response formats.

In accordance with one example embodiment, an apparatus may comprise: at least one processor; and at least one memory including computer program code; the at least one memory and the computer program code configured to, with the at least one processor, cause the apparatus to: transmit, to a client, an indication of one or more request-response overload capabilities; receive, from the client, at least one request for a plurality of media segments based, at least partially, on the indication of the one or more request-response overload capabilities; and transmit, to the client, at least one response comprising the plurality of media segments.

A media segment of the plurality of media segments may comprise at least one of: video metadata, audio metadata, timed metadata, or temporal information, wherein the media segment of the plurality of media segments is compressed into a bitstream.

The apparatus may comprise one of: a dynamic adaptive streaming over hypertext transfer protocol-aware network element, an edge server, an edge processor, an overload handler, a hypertext transfer protocol overload handler, or a content delivery network element.

The apparatus may be located on a same device as a server configured to store at least the plurality of media segments.

The plurality of media segments may comprise at least a first encoded media segment from a first adaptation set and a second encoded media segment from a second adaptation set, wherein the first adaptation set may be different from the second adaptation set.

At least one of the plurality of media segments may be stored in at least one of: a remote cache, a local cache, a local memory, a remote memory, the at least one non-transitory memory of the apparatus, or a media storage on a device separate from the apparatus.

The indication of the one or more request-response overload capabilities may comprise at least one of: an indication that the apparatus supports overloading, an indication of a uniform resource locator of the apparatus, an indication of one or more supported request formats the apparatus supports, or an indication of one or more supported response formats the apparatus supports.

The indication of the one or more request formats the apparatus supports may include an indication of at least one of: a uniform resource locator parameter based overloading format, a JavaScript object notation format, an extensible markup language format, a custom format, or a multipart batched request format.

The indication of the one or more response formats the apparatus supports may include an indication of at least one of: a multipart batch response payload format, a zipped response payload format, a tarred response payload format, a partial ISOBMFF response payload format, an ISO base media file format box sequence payload format, an omnidirectional media format late binding response payload format, a packed video response payload format, or a byte range response payload format.

The at least one request may comprise a request of a supported request format.

The at least one request may comprise a plurality of requests configured to request single media segments of the plurality of media segments.

The at least one request may comprise one overloaded request.

The at least one response may comprise a plurality of responses configured to deliver single media segments of the plurality of media segments.

The at least one response may comprise one overloaded response.

The example apparatus may be further configured to: pack the plurality of segments in the one overloaded response.

The example apparatus may be further configured to: pack a plurality of hypertext transfer protocol responses into an overloaded response, wherein transmitting the at least one response may comprise transmitting the overloaded response.

The at least one request may comprise an indication of a selected response format, wherein the packing may be based, at least partially, on the supported response format.

The at least one response may comprise a single response comprising the plurality of media segments, wherein the single response may comprise at least one: a zip archive, a tar archive, a multipart batch response, an ISO base media file format file, a multipart segment response, a box sequence, or a video stream packed using tile binding.

The plurality of media segments may comprise at least one of: media segments from different adaptation sets, or media segments from different representations.

The plurality of media segments may comprise media segments from multiple tracks, wherein a track of the multiple tracks may comprise a sequence of encoded media segments that are represented in a dynamic adaptive streaming over hypertext transfer protocol manifest as a representation in an adaptation set.

The example apparatus may be further configured to: transmit, to a content server, one or more requests for one or more of the plurality of media segments; and receive the one or more requested media segments from the content server.

The example apparatus may be further configured to: transmit, to the client, a media presentation description associated with the plurality of media segments.

The client may comprise one of: a dynamic adaptive streaming over hypertext transfer protocol-aware client, a client application, or a network management module.

The at least one request may comprise an indication of at least one of: a bandwidth, or viewing orientation.

The transmitting of the indication of the one or more request-response overload capabilities may comprise the example apparatus may be further configured to: transmit an overload information message, or transmit a server- and network-assisted dynamic adaptive streaming over hypertext transfer protocol message.

Transmitting the at least one response may comprise generating the at least one response according to an asynchronous response return model.

At least one of the at least one request may comprise an indication of one or more selected response formats, wherein the transmitted at least one response may comprise a response according to one of the one or more selected response formats.

In accordance with one example embodiment, an apparatus may comprise: circuitry configured to perform: transmit, to a client, an indication of one or more request-response overload capabilities; receive, from the client, at least one request for a plurality of media segments based, at least partially, on the indication of the one or more request-response overload capabilities; and transmit, to the client, at least one response comprising the plurality of media segments.

In accordance with one example embodiment, an apparatus may comprise: processing circuitry; memory circuitry including computer program code, the memory circuitry and the computer program code configured to, with the processing circuitry, enable the apparatus to: transmit, to a client, an indication of one or more request-response overload capabilities; receive, from the client, at least one request for a plurality of media segments based, at least partially, on the indication of the one or more request-response overload capabilities; and transmit, to the client, at least one response comprising the plurality of media segments.

In accordance with one example embodiment, an apparatus may comprise means for performing: transmitting, to a client, an indication of one or more request-response overload capabilities; receiving, from the client, at least one request for a plurality of media segments based, at least partially, on the indication of the one or more request-response overload capabilities; and transmitting, to the client, at least one response comprising the plurality of media segments.

A media segment of the plurality of media segments may comprise at least one of: video metadata, audio metadata, timed metadata, or temporal information, wherein the media segment of the plurality of media segments may be compressed into a bitstream.

The apparatus may comprise one of: a dynamic adaptive streaming over hypertext transfer protocol-aware network element, an edge server, an edge processor, an overload handler, a hypertext transfer protocol overload handler, or a content delivery network element.

The apparatus may be located on a same devices as a server configured to store at least the plurality of media segments.

The plurality of media segments may comprise at least a first encoded media segment from a first adaptation set and a second encoded media segment from a second adaptation set, wherein the first adaptation set may be different from the second adaptation set.

At least one of the plurality of media segments may be stored in at least one of: a remote cache, a local cache, a local memory, a remote memory, a media storage on the apparatus, or a media storage on a device separate from the apparatus.

The indication of the one or more request-response overload capabilities may comprise at least one of: an indication that the apparatus supports overloading, an indication of a uniform resource locator of the apparatus, an indication of one or more supported request formats the apparatus supports, or an indication of one or more supported response formats the apparatus supports.

The indication of the one or more request formats the apparatus supports may include an indication of at least one of: a uniform resource locator parameter based overloading format, a JavaScript object notation format, an extensible markup language format, a custom format, or a multipart batched request format.

The indication of the one or more response formats the apparatus supports may include an indication of at least one of: a multipart batch response payload format, a zipped response payload format, a tarred response payload format, a partial ISOBMFF response payload format, an ISO base media file format box sequence payload format, an omni-directional media format late binding response payload format, a packed video response payload format, or a byte range response payload format.

The at least one request may comprise a request of a supported request format.

The at least one request may comprise a plurality of requests configured to request single media segments of the plurality of media segments.

The at least one request may comprise one overloaded request.

The at least one response may comprise a plurality of responses configured to deliver single media segments of the plurality of media segments.

The at least one response may comprise one overloaded response.

The means may be further configured to perform: packing the plurality of segments in the one overloaded response.

The means may be further configured to perform: packing a plurality of hypertext transfer protocol responses into an overloaded response, wherein the means configured to perform transmitting of the at least one response may comprise means configured to perform transmitting of the overloaded response.

The at least one request may comprise an indication of a selected response format, wherein the packing may be based, at least partially, on the supported response format.

The at least one response may comprise a single response comprising the plurality of media segments, wherein the single response may comprise at least one: a zip archive, a tar archive, a multipart batch response, an ISO base media file format file, a multipart segment response, a box sequence, or a video stream packed using tile binding.

The plurality of media segments may comprise at least one of: media segments from different adaptation sets, or media segments from different representations.

The plurality of media segments may comprise media segments from multiple tracks, wherein a track of the multiple tracks may comprise a sequence of encoded media segments that may be represented in a dynamic adaptive streaming over hypertext transfer protocol manifest as a representation in an adaptation set.

The means may be further configured to perform: transmitting, to a content server, one or more requests for one or more of the plurality of media segments; and receiving the one or more requested media segments from the content server.

The means may be further configured to perform: transmitting, to the client, a media presentation description associated with the plurality of media segments.

The means configured to perform transmitting of the indication of the one or more request-response overload capabilities may comprise means configured to perform one of: transmitting an overload information message, or transmitting a server- and network-assisted dynamic adaptive streaming over hypertext transfer protocol message.

The means configured to perform transmitting of the at least one response may comprise means configured to perform generating of the at least one response according to an asynchronous response return model.

At least one of the at least one request may comprise an indication of one or more selected response formats, wherein the transmitted at least one response may comprise a response according to one of the one or more selected response formats.

In accordance with one example embodiment, a non-transitory computer-readable medium comprising program instructions stored thereon which, when executed with at least one processor, cause the at least one processor to: transmit, to a client, an indication of one or more request-response overload capabilities; receive, from the client, at least one request for a plurality of media segments based, at least partially, on the indication of the one or more request-response overload capabilities; and transmit, to the client, at least one response comprising the plurality of media segments.

In accordance with another example embodiment, a non-transitory program storage device readable by a machine may be provided, tangibly embodying a program of instructions executable by the machine for performing operations, the operations comprising: transmit, to a client, an indication of one or more request-response overload capabilities; receive, from the client, at least one request for a plurality of media segments based, at least partially, on the indication of the one or more request-response overload capabilities; and transmit, to the client, at least one response comprising the plurality of media segments.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modification and variances which fall within the scope of the appended claims.

What is claimed is:

1. An apparatus comprising:
   at least one processor; and
   at least one non-transitory memory and computer program code, wherein the at least one memory and the computer program code are configured to, with the at least one processor, cause the apparatus to:
      transmit, to a client, an indication of one or more request-response overload capabilities;
      receive, from the client, at least one request for a plurality of media segments based, at least partially, on the indication of the one or more request-response overload capabilities; and
      transmit, to the client, at least one response comprising the plurality of media segments.

2. The apparatus of claim 1, wherein a media segment of the plurality of media segments comprises at least one of:
   video metadata,
   audio metadata,
   timed metadata, or
   temporal information,
wherein the media segment of the plurality of media segments is compressed into a bitstream.

3. The apparatus of claim 1, wherein the apparatus comprises one of:
   a dynamic adaptive streaming over hypertext transfer protocol-aware network element,
   an edge server,
   an edge processor,
   an overload handler,
   a hypertext transfer protocol overload handler, or
   a content delivery network element.

4. The apparatus of claim 1, wherein the apparatus is located on a same device as a server configured to store at least the plurality of media segments.

5. The apparatus of claim 1, wherein the indication of the one or more request-response overload capabilities comprises at least one of:
   an indication that the apparatus supports overloading,
   an indication of a uniform resource locator of the apparatus,
   an indication of one or more supported request formats the apparatus supports, or
   an indication of one or more supported response formats the apparatus supports.

6. The apparatus of claim 1, wherein the at least one request comprises one of:
   a plurality of requests configured to request single media segments of the plurality of media segments, or
   one overloaded request.

7. The apparatus of claim 1, wherein the at least one response comprises one of:
   a plurality of responses configured to deliver single media segments of the plurality of media segments, or
   one overloaded response.

8. The apparatus of claim 1, wherein the at least one memory and the computer program code are further configured to, with the at least one processor, cause the apparatus to:
   pack the plurality of segments in one overloaded response.

9. The apparatus of claim 1, wherein the plurality of media segments comprise at least one of:
   media segments from different adaptation sets, or
   media segments from different representations.

10. The apparatus of claim 1, wherein the at least one memory and the computer program code are further configured to, with the at least one processor, cause the apparatus to:
    transmit, to a content server, one or more requests for one or more of the plurality of media segments; and
    receive the one or more requested media segments from the content server.

11. A method comprising:
    transmitting, from an overload handler to a client, an indication of one or more request-response overload capabilities;
    receiving, from the client, at least one request for a plurality of media segments based, at least partially, on the indication of the one or more request-response overload capabilities; and
    transmitting, to the client, at least one response comprising the plurality of media segments.

12. The method of claim 11, wherein a media segment of the plurality of media segments comprises at least one of:
    video metadata,
    audio metadata,
    timed metadata, or
    temporal information,
wherein the media segment of the plurality of media segments is compressed into a bitstream.

13. The method of claim 11, wherein the overload handler comprises one of:
    a dynamic adaptive streaming over hypertext transfer protocol-aware network element,
    an edge server,
    an edge processor,
    a hypertext transfer protocol overload handler, or
    a content delivery network element.

14. The method of claim 11, wherein the indication of the one or more request-response overload capabilities comprises at least one of:
    an indication that the overload handler supports overloading,
    an indication of a uniform resource locator of the overload handler,
    an indication of one or more supported request formats the overload handler supports, or
    an indication of one or more supported response formats the overload handler supports.

15. The method of claim 11, wherein the at least one request comprises one of:
    a plurality of requests configured to request single media segments of the plurality of media segments, or
    one overloaded request.

16. The method of claim 11, wherein the at least one response comprises one of:
    a plurality of responses configured to deliver single media segments of the plurality of media segments, or
    one overloaded response.

17. The method of claim 11, further comprising:
packing the plurality of segments in one overloaded response.

18. The method of claim 11, wherein the plurality of media segments comprise at least one of:
media segments from different adaptation sets, or
media segments from different representations.

19. The method of claim 11, further comprising:
transmitting, to a content server, one or more requests for one or more of the plurality of media segments; and
receiving the one or more requested media segments from the content server.

20. A non-transitory computer-readable medium comprising program instructions stored thereon which, when executed with at least one processor, cause the at least one processor to:
transmit, to a client, an indication of one or more request-response overload capabilities;
receive, from the client, at least one request for a plurality of media segments based, at least partially, on the indication of the one or more request-response overload capabilities; and
transmit, to the client, at least one response comprising the plurality of media segments.

\* \* \* \* \*